United States Patent
Nakata et al.

(10) Patent No.: US 11,102,412 B1
(45) Date of Patent: Aug. 24, 2021

(54) IMAGING APPARATUS

(71) Applicant: Panasonic Intellectual Property Management Co., Ltd., Osaka (JP)

(72) Inventors: Shusaku Nakata, Osaka (JP); Michio Kishiba, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/163,866

(22) Filed: Feb. 1, 2021

(30) Foreign Application Priority Data

Feb. 13, 2020  (JP) .............................. JP2020-022617
Aug. 21, 2020  (JP) .............................. JP2020-140281

(51) Int. Cl.
*H04N 5/232* (2006.01)

(52) U.S. Cl.
CPC ..... *H04N 5/23267* (2013.01); *H04N 5/23209* (2013.01); *H04N 5/23258* (2013.01); *H04N 5/23287* (2013.01)

(58) Field of Classification Search
None
See application file for complete search history.

(56) References Cited

U.S. PATENT DOCUMENTS

| | | | |
|---|---|---|---|
| 2005/0140793 A1 | 6/2005 | Kojima | |
| 2012/0224031 A1 | 9/2012 | Yamanaka | |
| 2013/0004151 A1* | 1/2013 | Wakamatsu | H04N 5/23287 396/55 |
| 2014/0184837 A1* | 7/2014 | Shibata | H04N 5/23267 348/208.6 |
| 2014/0186017 A1* | 7/2014 | Shibata | G03B 5/00 396/55 |
| 2014/0368912 A1 | 12/2014 | Imada | |
| 2015/0304564 A1* | 10/2015 | Noguchi | H04N 5/23258 348/208.11 |
| 2016/0021299 A1* | 1/2016 | Endo | H04N 9/04557 348/345 |
| 2017/0019600 A1* | 1/2017 | Koyano | G03B 17/14 |
| 2018/0288299 A1 | 10/2018 | Wada | |
| 2018/0288329 A1* | 10/2018 | Wada | H04N 5/23258 |

(Continued)

FOREIGN PATENT DOCUMENTS

| | | |
|---|---|---|
| JP | 2005-189654 A | 7/2005 |
| JP | 2012-186612 A | 9/2012 |

(Continued)

*Primary Examiner* — Cynthia Segura
(74) *Attorney, Agent, or Firm* — Renner, Otto, Boisselle & Sklar, LLP

(57) ABSTRACT

A controller of an imaging apparatus performs, if the controller can not obtain information on a focal length of an interchangeable lens from the interchangeable lens, the controller controls to perform an image stabilization operation using, as the focal length, an estimated focal length calculated based on at least one of a combination of a detected shake amount and an image motion amount in image data, or a combination of the detected shake amount and a motion amount of an image sensor. The controller controls whether to execute or stop the image stabilization operation by a first image stabilizer based on at least one of a correlation between the detected shake amount and the image motion amount, or a correlation between the detected shake amount and the motion amount of the image sensor.

13 Claims, 12 Drawing Sheets

(56) References Cited

U.S. PATENT DOCUMENTS

| | | | | |
|---|---|---|---|---|
| 2018/0302567 A1* | 10/2018 | Watanabe | ............... | G06T 5/006 |
| 2019/0124267 A1* | 4/2019 | Haruna | .............. | H04N 5/23287 |
| 2019/0141246 A1* | 5/2019 | Sugita | .................... | G03B 13/22 |
| 2019/0253630 A1* | 8/2019 | Koji Ma | ............ | H04N 5/23258 |
| 2019/0285967 A1 | 9/2019 | Himei | | |
| 2019/0394394 A1* | 12/2019 | Asajima | ............. | H04N 5/23209 |
| 2020/0036902 A1* | 1/2020 | Sugitani | ............. | H04N 5/23209 |
| 2020/0084358 A1* | 3/2020 | Nadamoto | ......... | H04N 5/23254 |
| 2020/0260010 A1* | 8/2020 | Nakajima | .............. | G03B 15/00 |

FOREIGN PATENT DOCUMENTS

| | | | |
|---|---|---|---|
| JP | 2015-018225 A | | 1/2015 |
| JP | 2018-173571 A | | 11/2018 |
| JP | 2019-144535 A | | 8/2019 |
| JP | 2019-149720 A | | 9/2019 |
| WO | 2018/025639 A1 | | 2/2018 |

\* cited by examiner

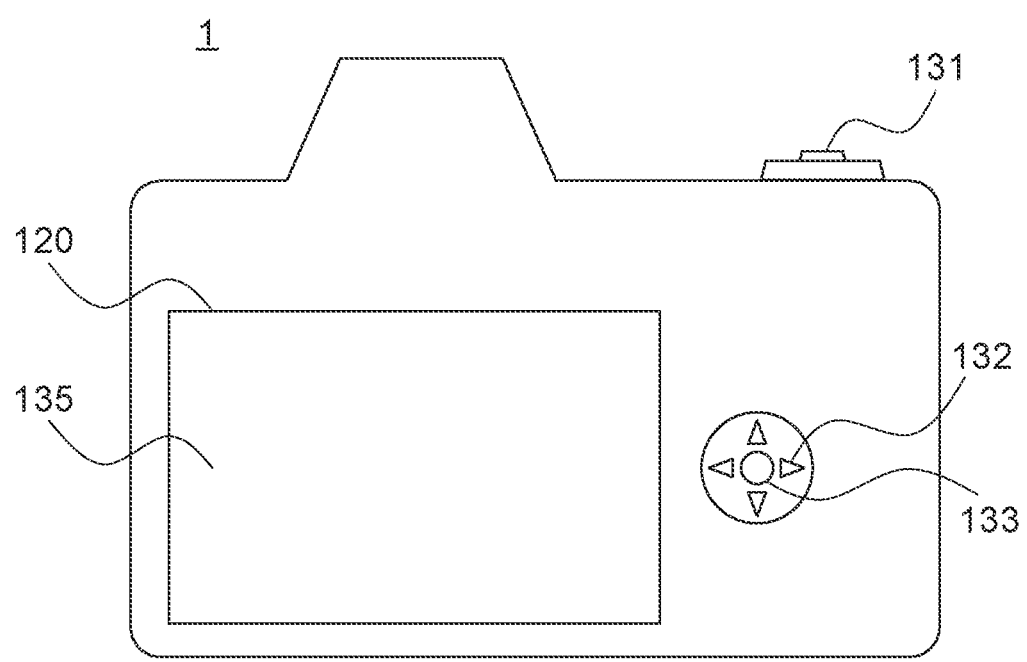

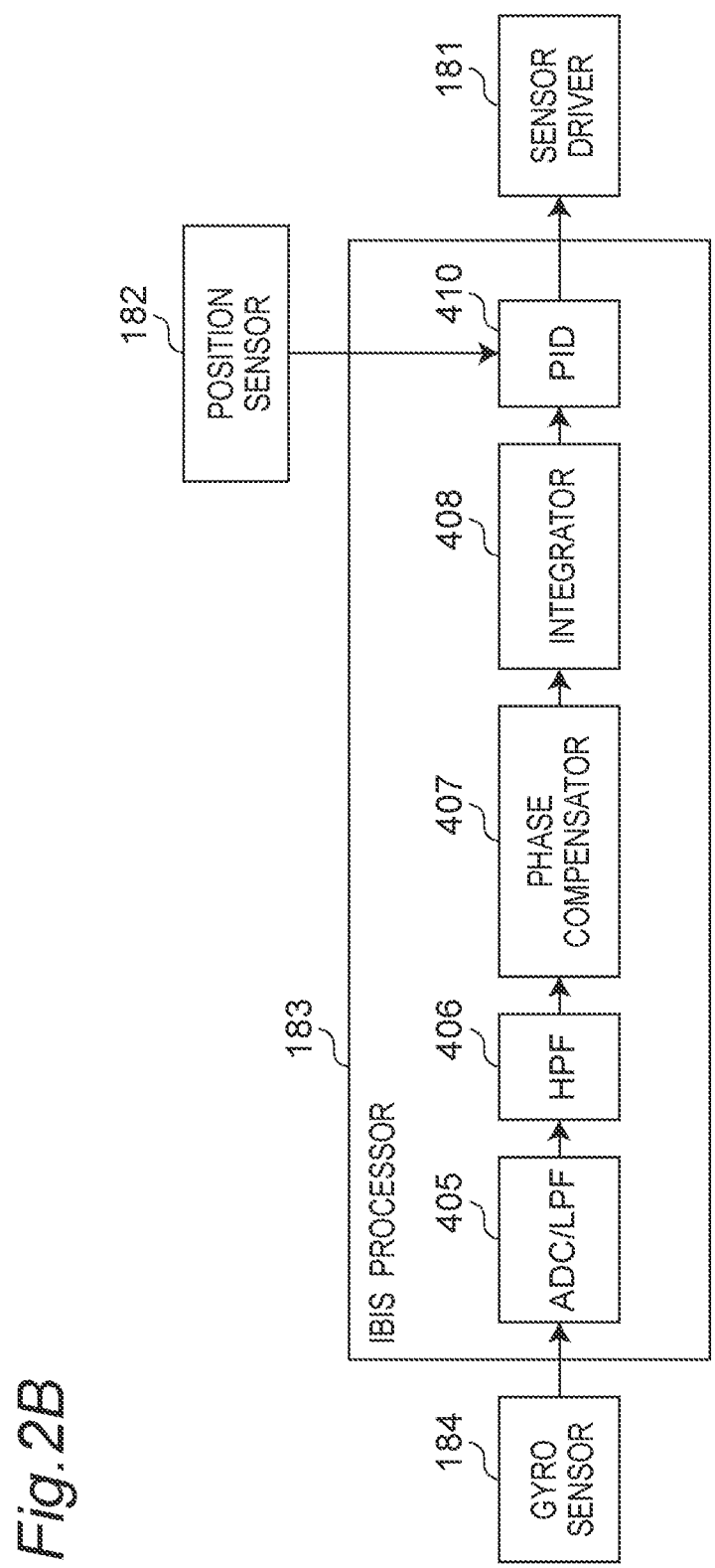

IMAGING APPARATUS

TECHNICAL FIELD

The present disclosure relates to an imaging apparatus attachable with an interchangeable lens thereto.

BACKGROUND

JP 2019-144535 A discloses a digital camera attachable with an interchangeable lens thereto. The digital camera of JP 2019-144535 A has a so-called IBIS function, that is, a body image stabilization function for driving an image sensor built in a camera body in order to correct a displacement of an image. IBIS function needs information on a focal length of an interchangeable lens, but an interchangeable lens may not communicate with the camera body.

The digital camera of JP 2019-144535 A displays a setting screen for inputting a focal length of an interchangeable lens on a display so that the focal length can be obtained by user input even if the interchangeable lens with no communication function is attached. Thus, IBIS function is implemented.

SUMMARY

However, the digital camera of JP 2019-144535 A requires a user to input a focal length of an interchangeable lens. Setting the focal length has been troublesome in some cases, for example, the input is required each time the camera is activated. There is still room for improvement in convenience of setting a focal length.

The present disclosure provides an imaging apparatus with improved convenience of setting a focal length.

The imaging apparatus according to the present disclosure is an imaging apparatus attachable with an interchangeable lens, the imaging apparatus comprising:

an image sensor configured to capture a subject image formed via the interchangeable lens to generate image data;

a shake detector configured to detect a shake amount of the imaging apparatus;

a first image stabilizer configured to perform an image stabilization operation based on the detected shake amount and a focal length of the interchangeable lens; and a controller configured to control the image stabilization operation by the first image stabilizer, wherein when the controller can not obtain information on the focal length of the interchangeable lens from the interchangeable lens, the controller controls to perform the image stabilization operation using an estimated focal length as the focal length of the interchangeable lens, the estimated focal length being calculated based on at least one of a combination of the detected shake amount and an image motion amount in the image data, or a combination of the detected shake amount and a motion amount of the image sensor, and the controller controls whether to execute or stop the image stabilization operation by the first image stabilizer based on at least one of a correlation between the detected shake amount and the image motion amount, or a correlation between the detected shake amount and the motion amount of the image sensor.

Further, the imaging apparatus according to the present disclosure is an imaging apparatus attachable with an interchangeable lens, the imaging apparatus comprising:

an image sensor configured to capture a subject image formed via the interchangeable lens to generate image data;

a shake detector configured to detect a shake amount of the imaging apparatus;

a first image stabilizer configured to perform an image stabilization operation based on the detected shake amount and a focal length of the interchangeable lens;

a controller configured to control the image stabilization operation by the first image stabilizer, wherein when the controller can not obtain information on the focal length of the interchangeable lens from the interchangeable lens, the controller controls to perform the image stabilization operation using an estimated focal length as the focal length of the interchangeable lens, the estimated focal length being calculated based on at least one of a combination of the detected shake amount and an image motion amount in the image data, or a combination of the detected shake amount and a motion amount of the image sensor, and the controller determines whether or not an image stabilization operation by a second image stabilizer provided in the interchangeable lens is being executed, based on at least one of a correlation between the detected shake amount and the image motion amount, or a correlation between the detected shake amount and the motion amount of the image sensor.

Further, the imaging apparatus according to the present disclosure is an imaging apparatus attachable with an interchangeable lens, the imaging apparatus comprising:

an image sensor configured to capture a subject image formed via the interchangeable lens to generate image data;

a shake detector configured to detect a shake amount of the imaging apparatus;

a first image stabilizer configured to perform an image stabilization operation based on the detected shake amount and a focal length of the interchangeable lens;

a controller configured to control the image stabilization operation by the first image stabilizer; and an input device configured to receive input of the focal length, wherein when the controller can not obtain information on the focal length of the interchangeable lens from the interchangeable lens, the controller controls, in a case of receiving no input of the focal length by the input device, to perform the image stabilization operation using an estimated focal length as the focal length of the interchangeable lens, and selects, in a case of receiving input of the focal length by the input device, either the estimated focal length or an input focal length as the focal length for the image stabilization operation based on comparison between the estimated focal length and the input focal length, and/or based on a reliability of the estimated focal length.

The imaging apparatus of the present disclosure improves convenience of setting a focal length.

BRIEF DESCRIPTION OF THE DRAWINGS

FIG. 2A is a diagram illustrating a back side of the digital camera;

FIG. 2B is a block diagram illustrating a configuration of an IBIS processor in the digital camera of the first embodiment;

DETAILED DESCRIPTION

An embodiment will be described below in detail with reference to the drawings as appropriate. However, more detailed description than necessary may be omitted. For example, detailed description of well-known matters and duplicate description of substantially the same configuration may be omitted. This is to avoid unnecessary redundancy in the following description and to facilitate understanding by those skilled in the art. Note that the inventor(s) provides the accompanying drawings and the following description in order for those skilled in the art to fully understand the present disclosure, and does not intend to limit the subject matter described in the claims by them.

First Embodiment

A configuration and operation of a digital camera, which is an embodiment of the imaging apparatus according to the present disclosure, will be described below.

1. Configuration

Figure 1:
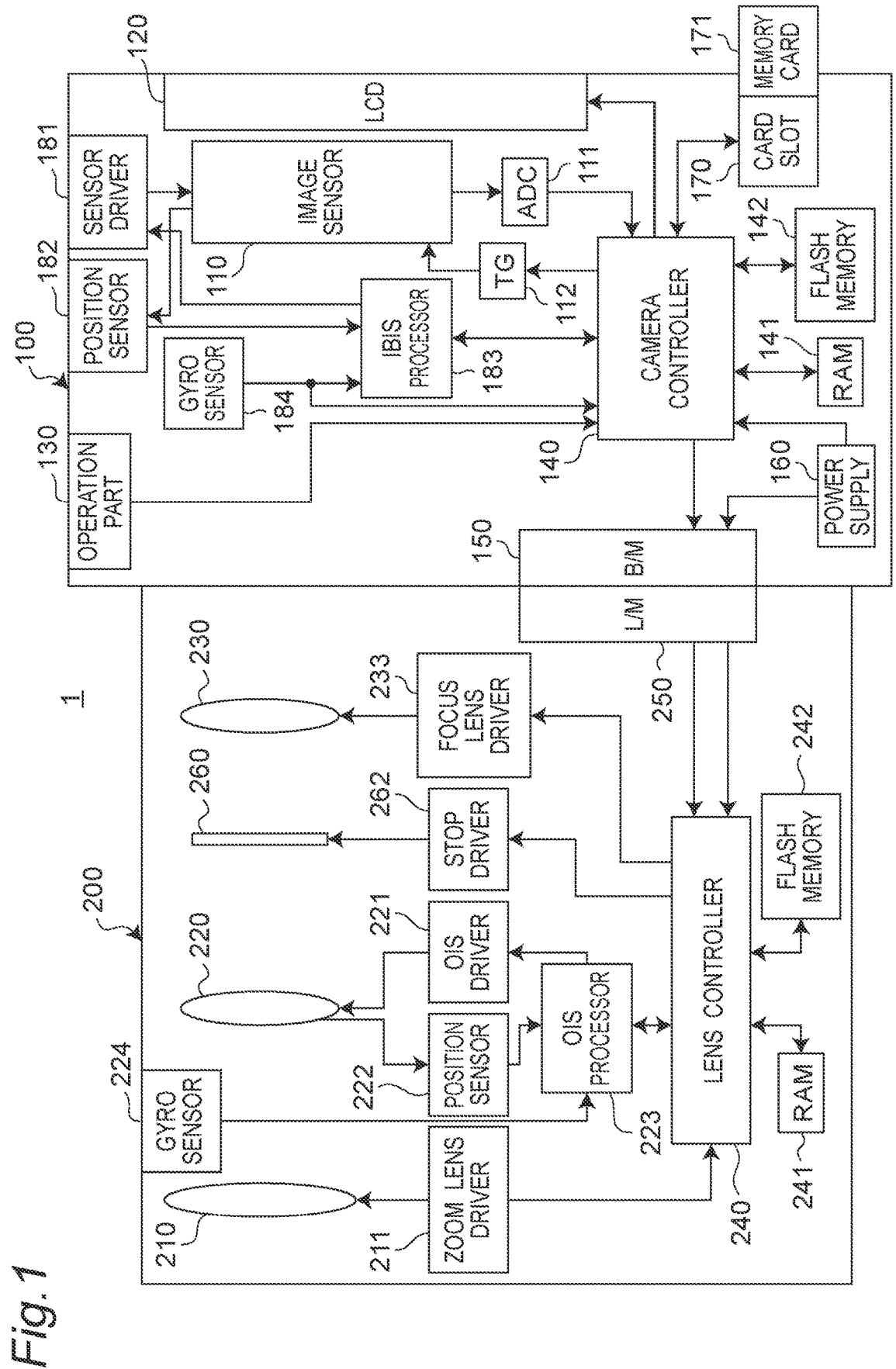
FIG. 1 is a diagram illustrating a configuration of a digital camera according to a first embodiment of the present disclosure.

FIG. 1 is a block diagram illustrating a configuration of a digital camera 1 according to a first embodiment. The digital camera 1 of the present embodiment includes a camera body 100 and an interchangeable lens 200. The interchangeable lens 200 is attachable to the camera body 100 and detachable from the camera body 100.

1-1. Camera Body

The camera body 100 (an example of the imaging apparatus) includes an image sensor 110, a liquid crystal monitor 120, an operation part 130, a camera controller 140, a body mount 150, a power supply 160, and a card slot 170.

The camera controller 140 controls an overall operation of the digital camera 1 by controlling components such as the image sensor 110 in accordance with instructions from the operation part 130. The camera controller 140 transmits a vertical synchronizing signal to a timing generator 112. The camera controller 140 uses a dynamic random access memory (DRAM) 141 as a work memory during a control operation or an image processing operation.

The image sensor 110 is an image sensor configured to capture a subject image incident via the interchangeable lens 200 to generate image data. The image sensor 110 is, for example, a complementary metal-oxide-semiconductor (CMOS) image sensor. The generated image data is digitized by an analog-to-digital (AD) converter 111. The camera controller 140 performs predetermined image processing on the digitized image data. The predetermined image processing is, for example, gamma correction processing, white balance correction processing, flaw correction processing, YC conversion processing, electronic zoom processing, or Joint Photographic Experts Group (JPEG) compression processing. The image sensor 110 may be a charge coupled device (CCD) or N-channel metal oxide semiconductor (NMOS) image sensor, or the like.

The image sensor 110 includes, for example, a phase difference sensor for an image plane phase difference method. Using the phase difference sensor, the camera controller 140 is configured to execute autofocus by the image plane phase difference method. Not limited to the image plane phase difference method, an autofocus function by any method may be adopted.

The image sensor 110 operates at a timing controlled by the timing generator 112. The image sensor 110 generates a still image, a moving image or a through image for recording. The through image is mainly a moving image, and is displayed on the liquid crystal monitor 120 for a user to determine a composition for capturing a still image.

The liquid crystal monitor 120 displays a variety of types of information such as an image (for example, through image) and a menu screen. Instead of the liquid crystal monitor, another type of display device may be used, for example, an organic electroluminescent display device.

The operation part 130 includes a variety of operation members such as a release button for instructing to start shooting, a mode dial for setting a shooting mode, and a power switch. The operation part 130 of the camera body 100 is illustrated in FIG. 2A.

FIG. 2A is a diagram illustrating a back side of the digital camera 1. FIG. 2A illustrates, as an example of the operation part 130, a release button 131, selection buttons 132, an OK button 133, and a touch panel 135. When receiving an operation by a user, the operation part 130 transmits instruction signals to the camera controller 140.

The release button 131 is a two-step push button. When the release button 131 is pressed halfway by a user, the camera controller 140 executes autofocus control (AF control), automatic exposure control (AE control), or the like. When the release button 131 is fully pressed by a user, the camera controller 140 records image data captured at the timing of the pressing operation on a memory card 171 or the like as a recorded image.

The selection buttons 132 are push buttons provided in up, down, left, and right directions. Pressing any of the up, down, left, and right selection buttons 132 allows a user to select one of various condition items displayed on the liquid crystal monitor 120 or to move a cursor.

The OK button 133 is a push button. When a user presses the OK button 133 with the digital camera 1 in a shooting mode or a reproduction mode, the camera controller 140 displays the menu screen on the liquid crystal monitor 120. The menu screen is a screen for setting various conditions for shooting/reproduction. When the OK button 133 is pressed with a setting item selected from the various conditions, the camera controller 140 establishes the setting of the selected item.

The touch panel 135 is arranged so as to overlap with a display screen of the liquid crystal monitor 120, and detects a touch operation on the display screen by a user's finger. This allows the user to perform an operation such as specifying an area corresponding to an image displayed on the liquid crystal monitor 120.

Returning to FIG. 1, the memory card 171 can be inserted into the card slot 170 to be controlled by the camera controller 140. The digital camera 1 can store image data in the memory card 171 and read image data from the memory card 171.

The power supply 160 is a circuit for supplying power to each element in the digital camera 1.

The body mount 150 can be mechanically connected with a lens mount 250 of the interchangeable lens 200. The body mount 150 supplies power from the power supply 160 to the entire interchangeable lens 200 via the lens mount 250. The interchangeable lens 200 of the first embodiment does not have a function to communicate with the camera body 100. The lens mount 250 is not electrically connected with the body mount 150, and the camera controller 140 of the camera body 100 and a lens controller 240 of the interchangeable lens 200 do not transmit/receive data to/from each other.

The camera body 100 further includes, as a configuration for implementing an IBIS function (a "In-Body Image Stabilization function" to correct camera shake by shifting the image sensor 110), a gyro sensor 184 (shake detector) configured to detect shake of the camera body 100 and an IBIS processor 183 configured to control shake correction processing based on a result of detection by the gyro sensor 184 or the like. The camera body 100 further includes a sensor driver 181 configured to move the image sensor 110, and a position sensor 182 configured to detect a position of the image sensor 110.

The sensor driver 181 may include, for example, a magnet and a flat plate coil. The position sensor 182 detects the position of the image sensor 110 in a plane perpendicular to an optical axis of an optical system. The position sensor 182 may include, for example, a magnet and a Hall element.

The IBIS processor 183 controls the sensor driver 181 based on a signal from the gyro sensor 184 and a signal from the position sensor 182 to shift the image sensor 110 in a plane perpendicular to the optical axis so as to cancel shake of the camera body 100. A range in which the image sensor 110 can be driven by the sensor driver 181 is mechanically limited. The range in which the image sensor 110 can be mechanically driven is referred to as a "drivable range".

1-2. Interchangeable Lens

The interchangeable lens 200 includes the optical system, the lens controller 240, and the lens mount 250. The optical system includes a zoom lens 210, an optical image stabilizer (OIS) lens 220, a focus lens 230, and a stop 260.

The zoom lens 210 is a lens for changing a magnification of a subject image formed by the optical system. The zoom lens 210 include one or more lenses. The zoom lens 210 is driven by a zoom lens driver 211. The zoom lens driver 211 includes a zoom ring operable by a user. Alternatively, the zoom lens driver 211 may include a zoom lever and an actuator or a motor. The zoom lens driver 211 moves the zoom lens 210 in a direction of the optical axis of the optical system in accordance with an operation by a user.

The focus lens 230 is a lens for changing a focus state of a subject image formed on the image sensor 110 by the optical system. The focus lens 230 includes one or more lenses. The focus lens 230 is driven by a focus lens driver 233.

The focus lens driver 233 includes an actuator or a motor, and moves the focus lens 230 along the optical axis of the optical system based on control of the lens controller 240. The focus lens driver 233 may include a direct-current (DC) motor, a stepping motor, a servo motor, an ultrasonic motor, or the like.

The OIS lens 220 is a lens to correct blur of a subject image formed by the optical system of the interchangeable lens 200 in an OIS function ("in-lens image stabilization function" to correct camera shake by shifting the OIS lens 220). The OIS lens 220 is moved in a direction to cancel shake of the digital camera 1 so that blur of a subject image on the image sensor 110 may be reduced. The OIS lens 220 includes one or more lenses. The OIS lens 220 is driven by an OIS driver 221.

Under control of an OIS processor 223, the OIS driver 221 shifts the OIS lens 220 in a plane perpendicular to the optical axis of the optical system. A range in which the OIS lens 220 can be driven by the OIS driver 221 is mechanically limited. The range is referred to as a range in which the OIS lens 220 can be mechanically driven by the OIS driver 221 (drivable range). The OIS driver 221 may include, for example, a magnet and a flat plate coil. A position sensor 222 detects a position of the OIS lens 220 in a plane perpendicular to the optical axis of the optical system. The position sensor 222 may include, for example, a magnet and a Hall element. The OIS processor 223 controls the OIS driver 221 based on an output from the position sensor 222 and an output from a gyro sensor 224 (shake detector).

The stop 260 adjusts an amount of light incident on the image sensor 110. A stop driver 262 drives the stop 260 to control a size of its aperture. The stop driver 262 includes a motor or an actuator.

The gyro sensor 184 or 224 detects shake (vibration) in a yawing direction and a pitching direction based on an angular change per unit time of the digital camera 1, that is, an angular velocity. The gyro sensor 184 or 224 outputs an angular velocity signal indicating an amount of the detected shake (angular velocity) to the IBIS processor 183 or the OIS processor 223, respectively. The angular velocity signal output by the gyro sensor 184 or 224 may include a wide range of frequency components caused by camera shake, mechanical noise, or the like. Instead of the gyro sensor, another sensor capable of detecting shake of the digital camera 1 can be used.

The camera controller 140 and the lens controller 240 may include a hard-wired electronic circuit, or may include a microcomputer using a program, or the like. For example, the camera controller 140 and the lens controller 240 may include a processor such as a central processor (CPU), a microprocessor unit (MPU), a graphics processor (GPU), a digital signal processor (DSP), a field programmable gate array (FPGA), or an application-specific integrated circuit (ASIC).

1-3. IBIS Processor

A configuration of the IBIS processor 183 in the camera body 100 will be described with reference to FIG. 2B. The IBIS processor 183 includes an analog-digital converter (ADC)/low-pass filter (LPF) 405, a high-pass filter (HPF) 406, a phase compensation unit 407, an integrator 408, and a proportional-integral-derivative (PID) controller 410.

The ADC/LPF 405 converts an angular velocity signal from the gyro sensor 184 from an analog format to a digital format. Further, the ADC/LPF 405 blocks high frequency components of the angular velocity signal converted into the digital format in order to remove noise and extract just shake of the digital camera 1. A frequency of camera shake by a photographer is low, that is, about 1 to 10 Hz, and a cutoff frequency of the LPF is set in consideration of the camera shake frequency. If noise is not a problem, LPF function may be omitted.

The HPF 406 blocks components of a predetermined low frequency contained in a signal received from the ADC/LPF 405 in order to block drift components.

The phase compensation unit 407 corrects a phase lag caused by the sensor driver 181 or the like with respect to a signal received from the HPF 406.

The integrator 408 integrates a signal indicating an angular velocity of shake (vibration) input from the phase compensation unit 407 to generate a signal indicating an angle of the shake (vibration) (hereinafter referred to as a "shake detection signal"). The shake detection signal from the integrator 408 is input to the PID controller 410.

The PID controller 410 generates a drive signal for shifting the image sensor 110 based on an output from the position sensor 182 and an output from the integrator 408, and then outputs the drive signal to the sensor driver 181. The sensor driver 181 drives the image sensor 110 based on the drive signal.

2. Operation

An operation of the digital camera 1 configured as described above will be described below.

As described above, the digital camera 1 of the first embodiment has both the body image stabilization function (that is, IBIS function) in the camera body 100 and the in-lens image stabilization function (that is, OIS function) in the interchangeable lens 200. Since the interchangeable lens 200 of the first embodiment does not have a function to communicate with the camera body 100, the camera body 100 does not recognize whether or not the OIS function of the interchangeable lens 200 is being executed. As a result, the camera body 100 may execute the IBIS function when the OIS function is being executed, or the camera body 100 may not execute the IBIS function when the OIS function is not being executed. In such a case, it is not possible to accurately correct blur of an image due to camera shake, not achieving a desired image stabilization operation.

Also, in order for the camera body 100 to execute the IBIS function, information on a focal length of the interchangeable lens 200 is necessary. However, the interchangeable lens 200 does not have a function to communicate with the camera body 100, and thus the camera body 100 can not obtain information on the focal length from the lens 200.

2-1. OIS operation Determination

According to the digital camera 1 of the first embodiment, even if the interchangeable lens 200 does not have a function to communicate with the camera body 100, the camera controller 140 of the camera body 100 determines whether or not the OIS operation of the interchangeable lens 200 is being executed. The determination is made based on a "shake amount" of the digital camera 1 based on an angular velocity indicated by a gyro signal from the gyro sensor 184, and a "motion vector" or a "motion amount" of an image calculated from image data of the image sensor 110. A specific determination method will be described later. The camera controller 140 uses a result of the determination as information for selecting whether to execute or stop an IBIS operation of the camera body 100.

The control described above improves functions related to an image stabilization operation by, for example, avoiding simultaneous execution of the IBIS function and the OIS function, and providing an alert notification when there is a high possibility of camera shake.

2-2. Setting Focal Length

Figure 3:
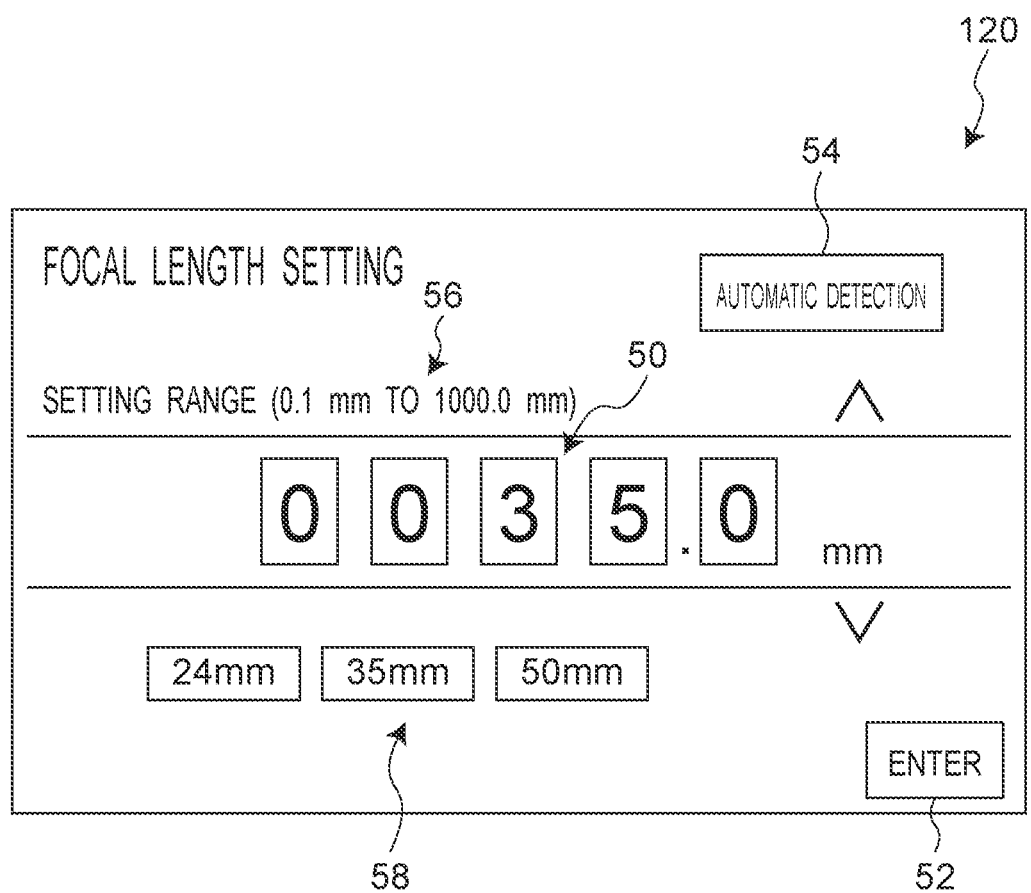
FIG. 3 is a diagram illustrating an example of a focal length setting screen.

The digital camera 1 of the first embodiment further displays a focal length setting screen as illustrated in FIG. 3 on the liquid crystal monitor 120. This setting screen enables a user to set the focal length necessary to execute the IBIS operation. On the setting screen illustrated in FIG. 3, it is possible to select either manual setting by a user input or automatic setting by the camera controller 140 for setting the focal length.

FIG. 3 is a diagram illustrating an example of a setting screen displayed on the liquid crystal monitor 120 of the camera body 100 for setting the focal length of the interchangeable lens 200. The setting screen illustrated in FIG. 3 displays an input area 50 for a focal length value, an enter key 52 for finalizing an input value, and an automatic detection key 54 for specifying automatic detection of the focal length. The setting screen further displays a range display section 56 indicating a range for a value that can be set in the input area 50, and a history display section 58 indicating history information of values previously input to the input area 50 and set as the focal length.

In the input area 50 of this setting screen, a user can input a focal length value using cursor buttons up, down, left, and right. When the user touches the enter key 52, the input value (input focal length) is stored as a candidate for a setting value of the focal length for the IBIS operation.

The user can further use the automatic detection key 54 on the setting screen to cause the camera body 100 to automatically calculate the focal length. When the automatic detection key 54 is touched, the camera controller 140 of the camera body 100 calculates the focal length (estimated focal length) based on a "shake amount" of the digital camera 1, and a "motion vector" or a "motion amount" of an image, as in the OIS operation determination described above. A specific method of calculating the estimated focal length will be described later. The calculated estimated focal length is stored as a candidate for the setting value of the focal length for the IBIS operation.

According to the setting screen described above, a user can select which of an "input focal length" or an "estimated focal length" is to be used as the focal length for the IBIS operation. Especially when an estimated focal length is used, the IBIS operation can be executed just by pressing the automatic detection key 54, so that it is not necessary to input the focal length using the input area 50, thereby improving convenience of setting a focal length.

2-3. Operation Details

Details of the operation of the digital camera 1 executing the image stabilization operation of the present embodiment will be described with reference to FIGS. 4 to 9B.

2-3-1. Setting of Focal Length

Figure 4:
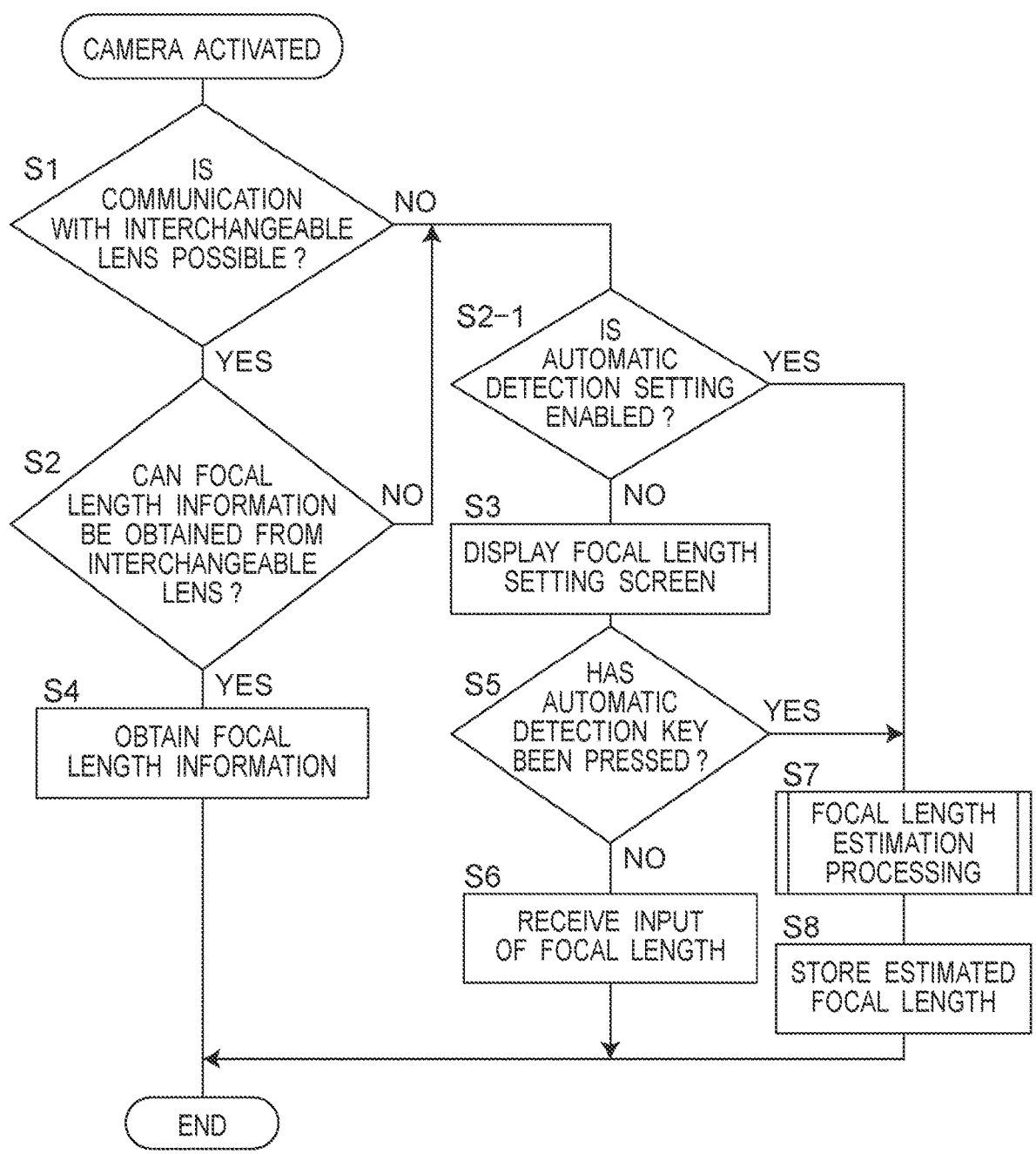
FIG. 4 is a flowchart illustrating an operation example of setting a focal length when the digital camera according to the first embodiment is activated.

FIG. 4 is a flowchart illustrating setting of the focal length when the digital camera 1 according to the first embodiment is activated. The flow illustrated in FIG. 4 starts, for example, when a power button of the camera body 100 to which the interchangeable lens 200 has been attached is pressed. Each piece of processing illustrated in the flowchart in FIG. 4 is executed by the camera controller 140, for example, in a state where the IBIS operation is not executed.

In FIG. 4, when the power of the digital camera 100 is turned on, the camera controller 140 of the camera body 100 determines whether or not communication with the interchangeable lens 200 is possible (S1). The camera controller 140 transmits a request for authentication information or the like to the interchangeable lens 200 via the body mount 150.

When a response is received from the lens controller 240 in response to the request, the camera controller 140 determines that communication with the interchangeable lens 200 is possible (YES in S1).

When the determination result is YES in step S, the camera controller 140 determines whether or not information on the focal length can be obtained from the interchangeable lens 200 (S2). The camera controller 140 transmits a request for various types of lens data to the interchangeable lens 200 via the body mount 150. When lens data including the information on the focal length is received from the lens controller 240 in response to the request, the camera controller 140 determines that the information on the focal length can be obtained (YES in S2).

When the determination result is YES in step S2, the camera controller 140 obtains the information on the focal length from the interchangeable lens 200 (S4). The camera controller 140 obtains the focal length (actual focal length) based on the lens data including the information on the focal length received in step S2, and then stores it in the RAM 141 as a final setting value of the focal length.

On the other hand, when the determination result is NO in step S1 or S2, the camera controller 140 determines whether or not an automatic detection setting is enabled (S2-1). The automatic detection setting is a setting for the camera body 100 to automatically detect the information on the focal length. In response to, for example, the automatic detection key 54 being pressed in the past, the automatic detection setting is stored in the RAM 141. For example, when there is a record of the automatic detection key 54 being pressed in the past, the camera controller 140 determines that the automatic detection setting is enabled (YES in S2-1), and then proceeds to step S7 described later.

When there is no record of the automatic detection key 54 being pressed in the past, the camera controller 140 determines that the automatic detection setting is not enabled (NO in S2-1), and then displays the focal length setting screen on the liquid crystal monitor 120 (S3). The camera controller 140 displays the display screen of the liquid crystal monitor 120 illustrated in FIG. 3 as the focal length setting screen.

According to the setting screen illustrated in FIG. 3, a user can select either manual setting using the input area 50 or automatic setting by the camera controller 140 for setting the focal length.

The camera controller 140 determines whether or not the automatic detection key 54 is pressed (S5). When the camera controller 140 has received a detection signal transmitted from the liquid crystal monitor 120 to the camera controller 140 in response to pressing of the automatic detection key 54, the camera controller 140 determines that the automatic detection key 54 is pressed (Yes in S5). When the camera controller 140 has not received the detection signal, the camera controller 140 determines that the automatic detection key 54 is not pressed (NO in S5).

When the determination result is NO in step S5, the camera controller 140 receives an input of the focal length (S6). When a user changes the value in the input area 50 using the cursor buttons up, down, left, and right and then presses the enter key 52 on the setting screen illustrated in FIG. 3, a signal indicating the value in the input area 50 as the focal length is transmitted from the liquid crystal monitor 120 to the camera controller 140. The camera controller 140 stores the focal length (input focal length) indicated by the signal in the RAM 141 as a candidate for the setting value of the focal length.

When the determination result is YES in step S5, or when the determination result is YES in step S2-1, the camera controller 140 performs focal length estimation processing (S7). Details of the specific estimation processing will be described later with reference to FIG. 5.

The camera controller 140 stores the estimated focal length calculated in step S7 in the RAM 141 as a candidate for the setting value of the focal length (S8).

Even when the determination result is NO in step S5 and then the processing of the flowchart in FIG. 4 ends without performing steps S7 and S8, an estimated focal length will be calculated when a flowchart in FIG. 7 described later is performed to execute a "OIS operation determination" in step S14 (and S13-1 in FIG. 8). In this case, both the input focal length (S6) and the estimated focal length (S13-1) are stored as candidates for the setting value of the focal length.

The camera controller 140 repeats the processing of the flowchart illustrated in FIG. 4 with a predetermined period, for example. The period is, for example, a frame period of a captured image or an integral multiple thereof.

According to the above-described flow, when the information on the focal length can be obtained from the interchangeable lens 200 (YES in S2), the actual focal length obtained from the interchangeable lens 200 is set as a setting value of the focal length for the IBIS operation (S4). When it is not possible to obtain the information on the focal length from the interchangeable lens 200 (NO in S1 or NO in S2), either the input focal length input via the setting screen of the liquid crystal monitor 120 or the estimated focal length calculated by the camera controller 140 is set as a candidate for the setting value of the focal length for the IBIS operation (S6 or S8).

Such a control enables the IBIS operation using either the input focal length or the estimated focal length even when it is not possible to obtain the information on the focal length from the interchangeable lens 200. This improves function and convenience of the image stabilization operation. When the automatic detection setting is enabled (YES in S2-1), the estimated focal length is used to execute the IBIS operation without the focal length setting screen being displayed (S3). This allows the IBIS operation to be automatically executed without a user's input operation, and thus convenience of setting a focal length can be improved. When the focal length setting screen is displayed, pressing of the automatic detection key 54 leads to calculation of the estimated focal length as a candidate for the setting value of the focal length. Thus, it is no longer necessary to input the focal length using the input area 50, and convenience of setting a focal length can be improved.

Next, details of the "focal length estimation processing (S7)" in FIG. 4 will be described with reference to a flowchart in FIG. 5.

Figure 5:
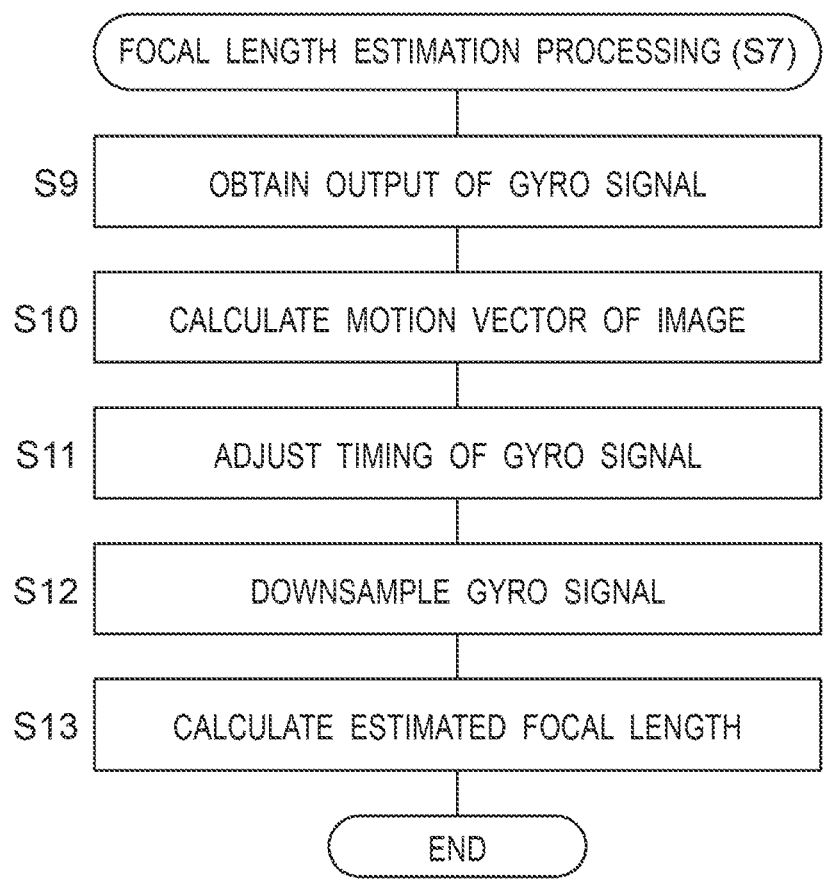
FIG. 5 is a flowchart illustrating an operation example of focal length estimation of the digital camera according to the first embodiment.

As illustrated in FIG. 5, the camera controller 140 obtains an output of a gyro signal (S9). The camera controller 140 receives an angular velocity signal output from the gyro sensor 184 as an output of a gyro signal. The angular velocity signal may be referred to as a "gyro signal". The gyro signal includes information on an angular velocity corresponding to shake of the digital camera 1.

The camera controller 140 calculates a motion vector of an image (S10). The motion vector of the image defines an amount by which the entire image moves in image data generated by the image sensor 110, that is, an "image motion amount". For example, in step S10, an amount of change ($\Delta MV/\Delta t$) in a motion vector (MV) of the entire image per time $\Delta t$ of a frame period is calculated as an image motion amount $\Delta M$. The camera controller 140 executes a predetermined image analysis on the image data generated by the image sensor 110 to calculate, for example, an amount of change in the motion vector (ΔMV/Δt) for each pixel of the image data, and then records the calculated amount in the RAM 141. When the calculated amount is stored in the RAM 141, filtering processing may be performed to exclude a component determined to be a motion vector due to a motion of a subject, not a motion of the entire image. This allows the motion amount ΔM of the entire image to be calculated more accurately. As a method of calculating the motion amount ΔM, any method may be adopted.

The camera controller 140 adjusts the timing of the gyro signal (S11). The camera controller 140 corrects a lag between the time of the gyro signal obtained in step S9 and the time of the motion amount ΔM calculated in step S10 by, for example, providing a delay time. Any method to correct the time may be adopted.

The camera controller 140 downsamples the gyro signal (S12). The camera controller 140 performs the downsampling of the gyro signal so that a sampling period of the gyro signal sampled by the gyro sensor 184 matches a sampling period of the motion vector MV calculated by the camera controller 140. The sampling period of the gyro signal is, for example, 0.25 ms (4000 Hz), and the sampling period of the motion vector MV of the image is, for example, 16.7 ms (60 Hz). Any method of downsampling may be adopted.

The camera controller 140 calculates an estimated focal length (S13). The estimated focal length is a focal length of the interchangeable lens 200 automatically calculated by the camera body 100 based on various types of information. The estimated focal length is calculated based on the "shake amount" of the digital camera 1 and the "motion amount ΔM" of the image indicated by the gyro signal obtained in steps S9 to S13. A specific method of calculating the estimated focal length will be described with reference to FIG. 6.

Figure 6:
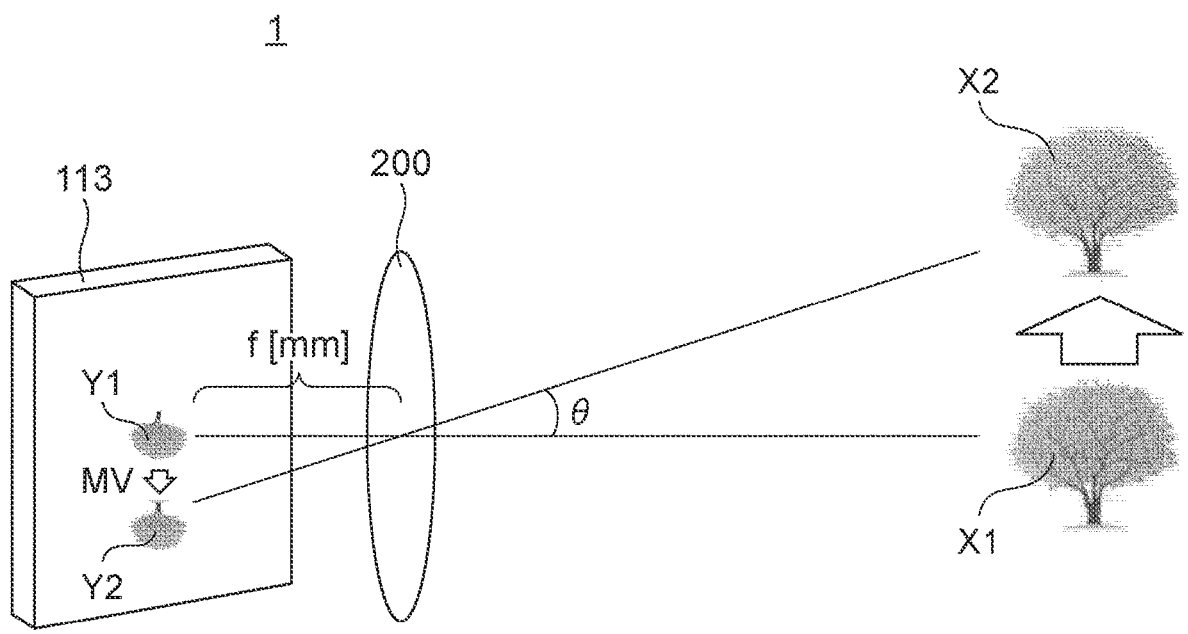
FIG. 6 is a schematic diagram for illustrating a relationship between, for example, a focal length and a motion vector of the digital camera according to the first embodiment.

FIG. 6 is a schematic diagram illustrating a relationship among a focal length f, the motion vector MV, and a shake angle θ when a subject image is formed on an image sensor 113 of the image sensor 110 via the interchangeable lens 200.

As illustrated in FIG. 6, a subject X1 at a certain time point is formed as a subject image Y1 on the image sensor 113 via the interchangeable lens 200. After that, for example, when one frame period (time Δt) of the captured image elapses, the subject X1 appears to have moved to a subject X2 due to camera shake. The moved subject X2 is formed as a subject image Y2 on the image sensor 113 via the interchangeable lens 200.

A distance from the interchangeable lens 200 to the image sensor 113 is the focal length f (unit: mm) of the interchangeable lens 200. An angle between the subject X1 and the subject X2 with respect to the center of the interchangeable lens 200 is the shake angle θ (unit: rad), and dθ/dt obtained by differentiating the shake angle θ corresponds to an angular velocity ω (rad/s) indicated by the gyro signal of the gyro sensor 184. The shake angle θ corresponds to the shake amount of the digital camera 1. Hereinafter, the angular velocity ω and the shake angle θ obtained by integrating the angular velocity ω are collectively referred to as a "shake amount". An amount of movement from the subject image Y1 to the subject image Y2 is represented by the motion vector MV (unit: mm) of the image.

Regarding the distance and the angle illustrated in FIG. 6, for example, when the time Δt is one frame period of the captured image, the shake angle θ is very small, and therefore the following equation 1 is established as an approximate equation.

[Math 1]

$$\frac{\Delta MV}{\Delta t} = f \cdot \frac{d\theta}{dt} = f \cdot \omega \quad \text{(equation 1)}$$

In equation 1, the focal length f can be calculated by assigning values to the angular velocity and the image motion amount ΔM (=ΔMV/Δt) obtained in steps S9 to S12.

In step S13, a single regression analysis is performed to obtain the focal length f from equation 1, for example. The camera controller 140 accumulates, as sample data, the image motion amount ΔM and the corresponding angular velocity ω of the image at the same timing, and then conducts a single regression analysis on the accumulated sample data to calculate the focal length f. The obtained focal length f is stored in the RAM 141 as an estimated focal length.

The camera controller 140 of the first embodiment further calculates a correlation coefficient between the shake amount and the motion amount ΔM in step S13, and the calculated correlation coefficient is stored in the RAM 141 as a reliability of the estimation result. Note that another algorithm such as Kalman filter may be used. In the case of Kalman filter, "dispersion" may be used as the reliability, for example. In the case of other algorithms, any parameter related to reliability may be used as the reliability.

In this first embodiment, when processing of the flowcharts illustrated in FIGS. 4 and 5 ends, the camera controller 140 uses the focal length f to determine whether to execute or stop the IBIS operation described below.

2-3-2. Determining Whether to Execute or Stop IBIS Operation

Figure 7:
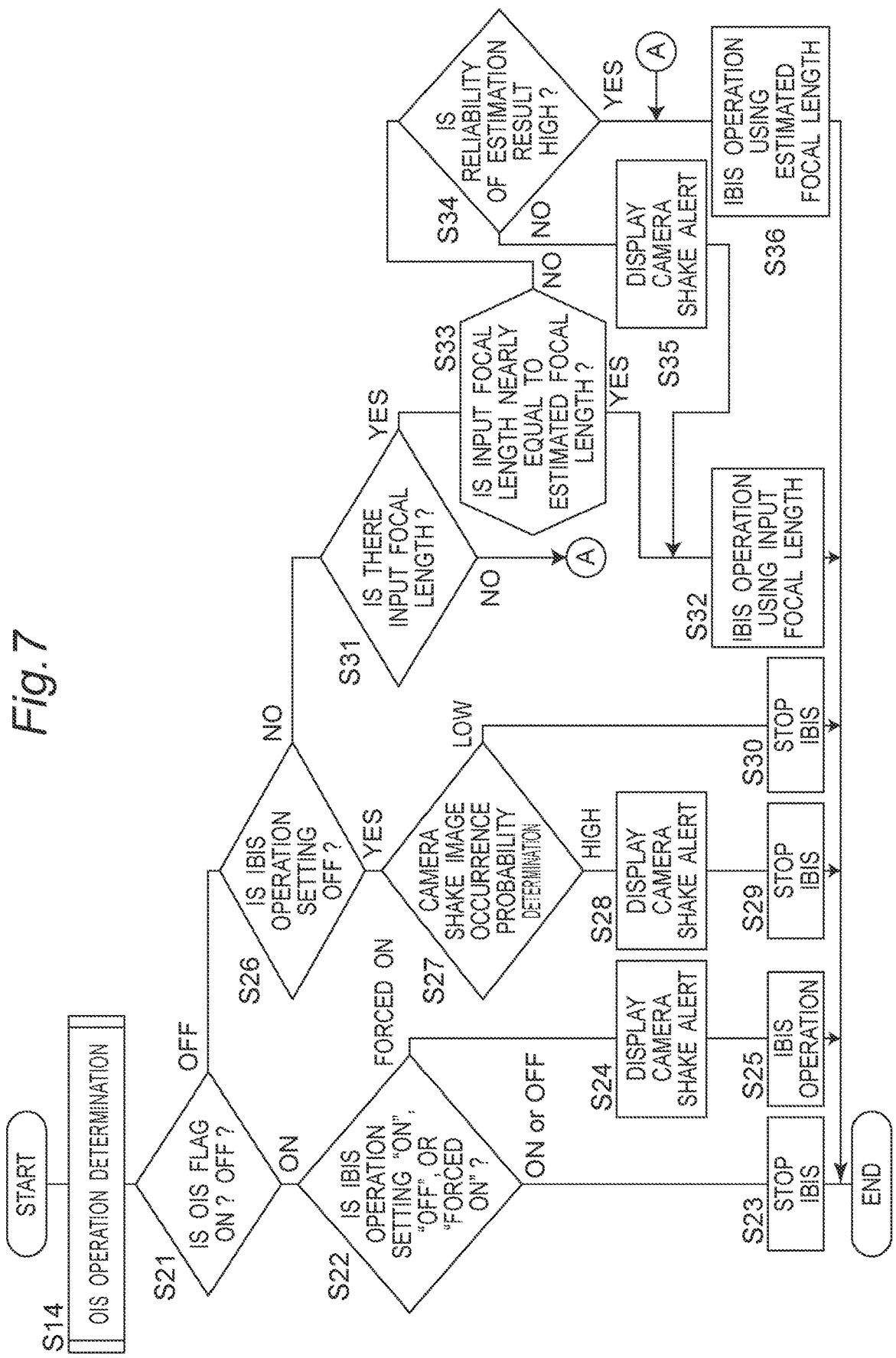
FIG. 7 is a flowchart illustrating an operation example of processing of determining whether to execute or stop an IBIS operation of the digital camera according to the first embodiment.

FIG. 7 is a flowchart illustrating the determining processing of whether to execute or stop the IBIS operation, including the OIS operation determination in the digital camera 1 according to the first embodiment. The flow illustrated in FIG. 7 starts when the flowchart illustrated in FIG. 4 have ended. Each piece of processing illustrated in the flowchart in FIG. 7 is executed by the camera controller 140, for example, in a state where the IBIS operation is not being executed.

As illustrated in FIG. 7, the camera controller 140 executes OIS operation determination (S14). As in the processing of calculating the estimated focal length described above, the camera controller 140 determines whether or not the OIS operation of the interchangeable lens 200 is being executed based on the shake amount of the digital camera 1 and the image motion amount ΔM.

Specific processing of the OIS operation determination will be described with reference to FIG. 8. FIG. 8 is a flowchart illustrating an example of the processing of the OIS operation determination in the digital camera 1 according to the first embodiment.

Figure 8:
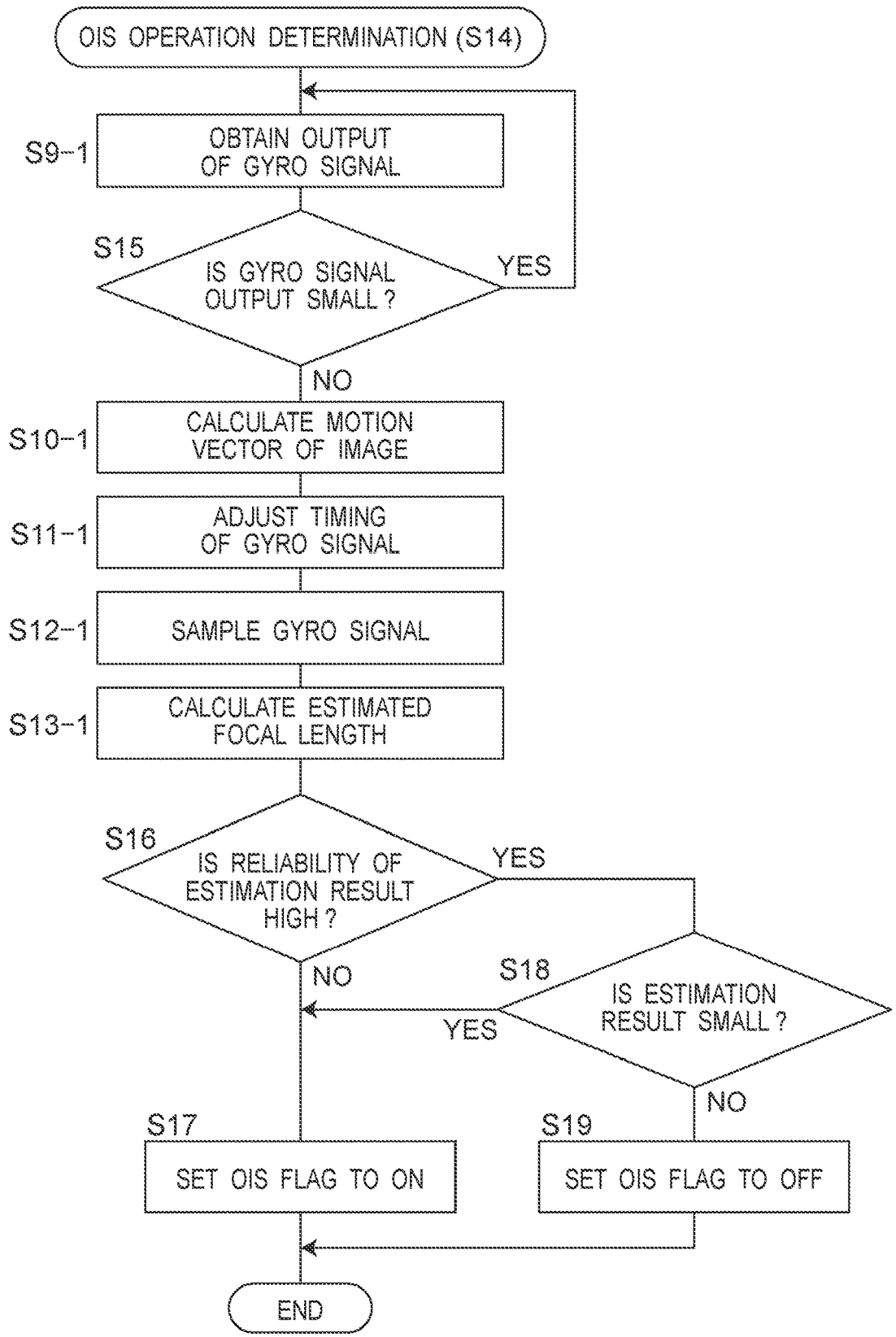
FIG. 8 is a flowchart illustrating an operation example of OIS operation determination in the digital camera according to the first embodiment.

As illustrated in FIG. 8, the camera controller 140 obtains an output of a gyro signal (S9-1). Step S9-1 performs processing similar to that of step S9 described above. Detailed explanation of step S9-1 is omitted.

The camera controller 140 determines whether or not the gyro signal is small (S15). The camera controller 140 compares an angular velocity indicated by the gyro signal obtained in step S9-1 with a predetermined threshold value stored in advance in a flash memory 142, for example. The threshold value indicates, for example, a criterion of occurrence of camera shake in the camera body 100. When the angular velocity indicated by the gyro signal is smaller than the predetermined threshold value, the camera controller 140 determines that the gyro signal is small (YES in S15), and executes step S9-1 again. When the angular velocity indicated by the gyro signal is larger than the predetermined threshold value, the camera controller 140 determines that the gyro signal is not small (NO in S15), and then proceeds to step S10-1. When a cycle of the gyro signal being determined to be small (YES in S15) and step S9-1 being executed has been repeated for a predetermined number of times or more in a row, the processing may proceed to step S10-1 without executing step S9-1 more, using the outputs of the gyro signals that have been obtained until then.

In a similar manner to steps S10 to S13 described above, the camera controller 140 calculates a motion vector MV of the image (S10-1), adjusts the timing of the gyro signal (S11-1), downsamples the gyro signal (S12-1), and calculates an estimated focal length (S13-1). Detailed explanation of steps S10-1 to S13-1 is omitted.

The camera controller 140 determines whether or not a reliability of the estimation result is higher than a predetermined threshold value, for example (S16). The camera controller 140 compares the reliability of the estimation result calculated in step S13-1 with the predetermined threshold value stored in advance in the flash memory 142, for example.

When the camera controller 140 determines that the reliability of the estimation result is lower than the predetermined threshold value and the reliability is not high (NO in S16), the camera controller 140 sets an OIS flag to ON (S17), and then stores it in the RAM 141. The OIS flag is a flag for managing, in the form of ON or OFF, a result of determination of whether or not the OIS operation of the interchangeable lens 200 is being executed. The reliability of the estimation result is calculated based on a degree of correlation between the "shake amount" of the digital camera 1 and the "motion amount ΔM" of the image. When the reliability of the estimation result is low, it means that the degree of correlation between the shake amount and the motion amount ΔM is low, thereby speculating that the correlation is low because the OIS operation is being executed. While the shake amount indicated by the gyro signal is not affected by execution of the OIS operation, the motion amount ΔM based on the motion vector MV of the image is reduced when the OIS operation is executed. Therefore, execution of the OIS operation has caused the shake amount and the motion amount ΔM to have values that do not correlate with each other.

When the reliability of the estimation result is higher than the predetermined threshold value and the camera controller 140 determines that the reliability is high (YES in S16), the reliability of the estimation result is high, and the shake amount and the motion amount ΔM have a higher correlation with each other. However, even in this case, the OIS operation may be possibly executed.

The camera controller 140 therefore determines whether or not the estimation result of the focal length is small (S18). The camera controller 140 determines whether or not the estimation result is small by comparing the estimated focal length calculated in step S13-1 with a predetermined threshold value stored in advance in the flash memory 142, for example. The threshold value indicates a criterion assumed as the focal length of the interchangeable lens 200, for example. When the estimated focal length is larger than the predetermined threshold value, the camera controller 140 determines that the estimation result is not small (NO in S18), then sets the OIS flag to OFF (S19), and stores it in the RAM 141. The OIS flag being set to OFF indicates that the OIS operation of the interchangeable lens 200 is not being executed.

When it is determined that the estimation result is small (YES in S18), the camera controller 140 proceeds to step S17 and sets the OIS flag to ON, as in the case where the determination result is NO in step S16. The OIS flag being set to ON indicates that the OIS operation of the interchangeable lens 200 is being executed. When the OIS operation is being executed, the "motion amount ΔM" based on the motion vector MV is relatively smaller than the "shake amount" that is not affected by execution of the OIS operation. On the other hand, as indicated by equation 1 described above, the amount of change in the motion vector ΔMV/Δt corresponding to the motion amount ΔM has a substantially proportional relationship with the focal length f, and therefore the calculated focal length f becomes smaller as the motion amount ΔM is smaller. Thus, even when there is a correlation between the shake amount and the motion amount ΔM (YES in S16), when the calculated focal length f is considerably small (YES in S18), it is considered that the motion amount ΔM has become smaller because the OIS operation is being executed, and thus the OIS flag is set to ON (S17).

Returning to FIG. 7, the camera controller 140 determines whether the OIS flag is ON or OFF (S21). The camera controller 140 determines whether the OIS flag is ON or OFF based on setting of the OIS flag recorded in the RAM 141.

When it is determined in step S21 that the OIS flag is set to ON, the camera controller 140 determines whether an IBIS operation setting is "ON", "OFF", or "forced ON" (S22). The IBIS operation setting is stored in the camera body 100 as setting information regarding execution of the IBIS operation. For example, on the menu screen displayed on the liquid crystal monitor 120, a user can set the IBIS operation setting to any of "ON", "OFF", and "forced ON" modes (IBIS modes) via the operation part 130. The camera controller 140 reads out setting information stored in the camera body 100 to determine whether the IBIS operation setting is "ON", "OFF", or "forced ON".

When it is determined in step S22 that the IBIS operation setting is "ON" or "OFF", the camera controller 140 controls to stop the IBIS operation (S23). Since it is determined in the previous step S21 that the OIS flag is set to ON, the OIS operation of the interchangeable lens 200 is likely to be executed. In such a situation, the IBIS operation is not executed not only when the IBIS operation setting is OFF but also when the IBIS operation setting is ON, thereby stopping the OIS operation and the IBIS operation from being executed independently at the same time. This improves an accuracy of the image stabilization operation.

When it is determined in step S22 that the IBIS operation setting is "forced ON", the camera controller 140 displays on the liquid crystal monitor 120 an alert for occurrence of camera shake (S24), and forcibly executes the IBIS operation (S25). Which of the input focal length or the estimated focal length is to be used as the focal length for the IBIS operation may be determined similar to step S31 and the subsequent steps, for example.

Even when it is determined in the previous step S21 that the OIS flag is set to ON, but the IBIS operation setting is "forced ON", the IBIS operation is forcibly executed so that a control in accordance with a user's intention can be performed. In that case, there is a high possibility that the IBIS operation and the OIS operation are executed independently at the same time. Thus, an alert will be displayed on the liquid crystal monitor 120 so that information regarding camera shake is displayed and a user is informed that camera shake is likely to occur.

Figure 9A:
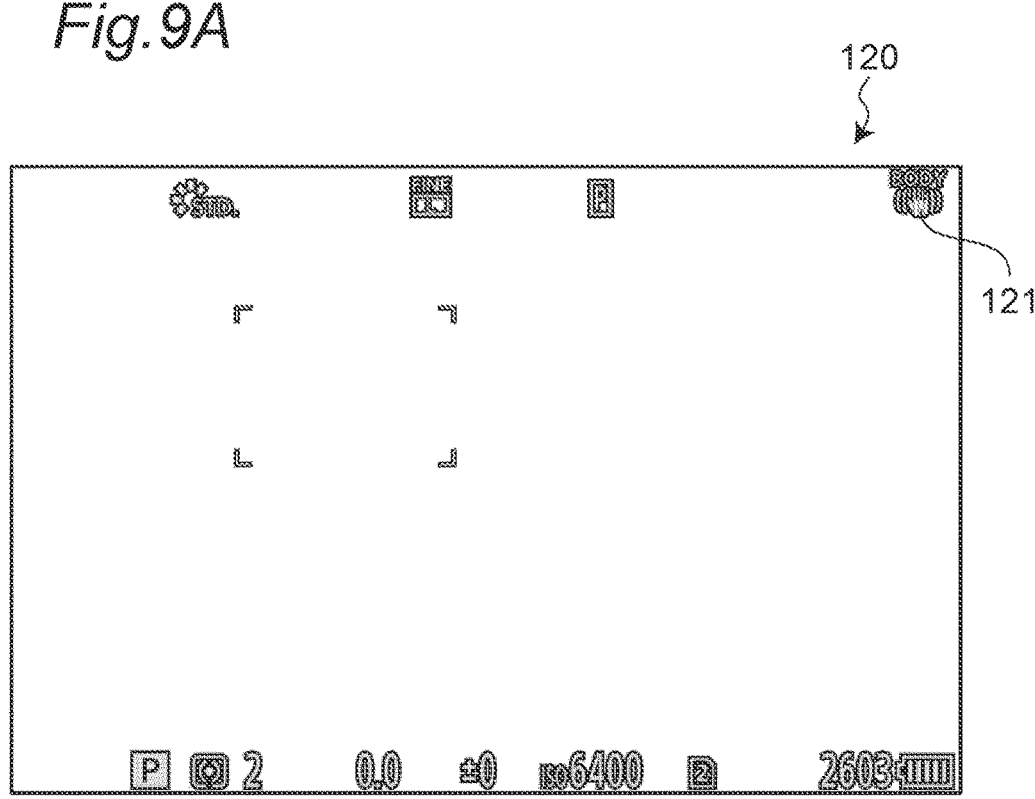
FIG. 9A is a diagram illustrating a display example of a liquid crystal monitor of the digital camera according to the first embodiment.
Figure 9B:
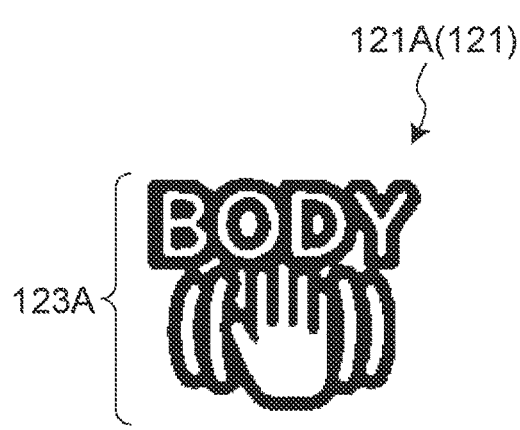
FIGS. 9B and 9C are diagrams illustrating an example of a change in a camera shake icon in the display example in FIG. 9A.
Figure 9C:
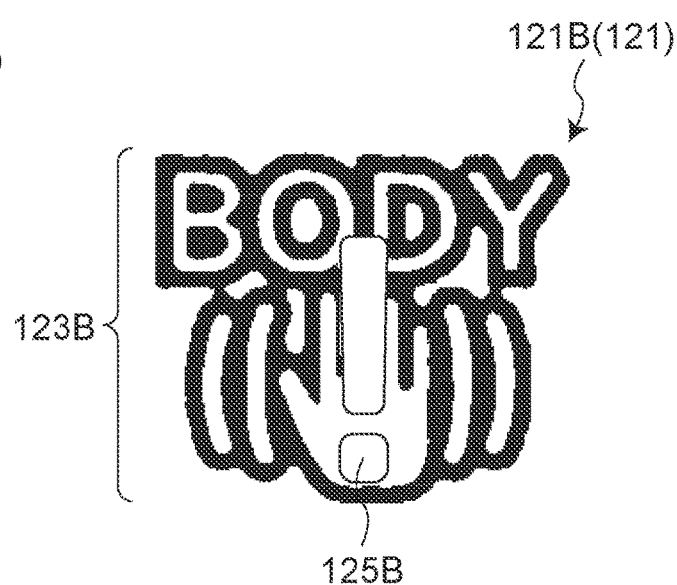

An example of information regarding camera shake displayed in step S24 will be described with reference to FIGS. 9A-9C. FIG. 9A is a diagram illustrating a display example when a through image is displayed on the liquid crystal monitor 120. FIGS. 9B and 9C are diagrams illustrating an example of a change in display mode of a camera shake icon 121.

As illustrated in FIG. 9A, the camera shake icon 121 is displayed on the liquid crystal monitor 120. The camera shake icon 121 indicates whether camera shake is likely to occur. The camera shake icon 121 illustrated in FIG. 9A indicates that camera shake is not likely to occur.

FIG. 9B illustrates a camera shake icon 121A when it is not determined that camera shake is likely to occur, and FIG. 9C illustrates a camera shake icon 121B when it is determined that camera shake is likely to occur. The camera shake icon 121B illustrated in FIG. 9C is an alert for occurrence of camera shake. The display mode is switched between FIG. 9B and FIG. 9C by, for example, the camera controller 140.

The camera shake icon 121A illustrated in FIG. 9B includes a camera shake symbol 123A indicating camera shake. The camera shake symbol 123A in the first embodiment includes letters "BODY" and a mark of a hand swaying sideways. The camera shake symbol 123A is always lit.

The camera shake icon 121B illustrated in FIG. 9C includes a camera shake symbol 123B indicating camera shake and an alert symbol 125B. The camera shake symbol 123B is an enlarged version of the camera shake symbol 123A illustrated in FIG. 9B in a different display color (for example, red), and is made to blink at a predetermined interval. In the example illustrated in FIG. 9C, the alert symbol 125B is an exclamation icon, and is displayed so as to overlap the camera shake symbol 123B.

When it is determined that camera shake is likely to occur, the display mode of the camera shake icon 121 is changed from the camera shake icon 121A shown in FIG. 9B to the camera shake icon 121B in FIG. 9C so that a user is notified that camera shake is likely to occur.

In the example illustrated in FIGS. 9B and 9C, (1) color change, (2) size enlargement, (3) blinking display, and (4) superimposed display of the alert symbol 125B are all applied to the camera shake symbol 123B, but such a case is not restrictive. Alternatively, one of or a combination of two or more of (1) to (4) may be applied.

Returning to FIG. 7, when it is determined in step S21 that the OIS flag is set to OFF, the camera controller 140 determines whether or not the IBIS operation setting is "OFF" (S26). As in the step S22, the camera controller 140 determines whether or not the IBIS operation setting is "OFF" by reading setting information stored in the camera body 100. When the IBIS operation setting is "ON" or "forced ON", the camera controller 140 determines that the IBIS operation setting is not "OFF" (NO in S26).

When it is determined that the IBIS operation setting is OFF (YES in S26), the camera controller 140 determines a probability of occurrence of a camera shake image (S27). The camera controller 140 calculates an expected amount of shake based on a magnitude of shake detected by the gyro sensor 184, the focal length (input focal length or estimated focal length), and a shutter speed to determine a possibility of blur in an image displayed on the liquid crystal monitor 120. Based on the expected amount of shake, the camera controller 140 determines whether the probability of occurrence of a camera shake image is high or low.

When it is determined in step S27 that the probability of occurrence of a camera shake image is high, the camera controller 140 displays on the liquid crystal monitor 120 an alert for occurrence of camera shake (S28), and controls to stop the IBIS operation (S29). In step S28, the same display as the display example illustrated in FIG. 9C may be displayed on the liquid crystal monitor 120, for example.

As described above, when the OIS flag is OFF in step S21 and the IBIS operation setting is OFF in step S26, the IBIS operation is not executed (S29) and camera shake is not corrected. In such a case, an alert regarding occurrence of camera shake is provided (S28) so that a user is informed that camera shake is likely to occur.

On the other hand, when it is determined in step S27 that the probability of occurrence of a camera shake image is low, the camera controller 140 does not display an alert for occurrence of camera shake as in step S28, but controls to stop the IBIS operation (S30).

When it is determined in step S26 that the IBIS operation setting is not "OFF" because it is "ON" or "forced ON", the camera controller 140 determines whether there is an input focal length (S31). The camera controller 140 makes the determination based on whether the input focal length obtained by executing step S6 illustrated in FIG. 4 is stored in the RAM 141. When the input focal length is not stored, it is determined that there is no estimation result of an input distance (NO in S31), and the camera controller 140 uses the estimated focal length to execute the IBIS operation (S36). The camera controller 140 executes the IBIS operation using the estimated focal length and the shake amount of the digital camera 1 based on the gyro signal of the gyro sensor 184.

As described above, when it is determined in step S21 that the OIS flag setting is "OFF", it is determined in step S26 that the IBIS operation setting is not "OFF", and there is no input focal length (NO in S31), the estimated focal length is used to execute the IBIS operation (S36). Thus, the IBIS operation can be executed alone without the OIS operation being executed, thereby implementing an image stabilization function using the estimated focal length.

When it is determined that there is an input focal length (YES in S31), the camera controller 140 determines whether or not the input focal length is nearly equal to the estimated focal length (that is, whether or not the input focal length and the estimated focal length are approximate or substantially the same to each other) (S33). For example, based on whether or not the input focal length obtained in step S6 is within a predetermined range based on the estimated focal length calculated in step S13 or S13-1, the camera controller 140 determines whether or not the input focal length is nearly equal to the estimated focal length.

When it is determined that the input focal length is nearly equal to the estimated focal length (that is, the input focal length and the estimated focal length are approximate to each other) (YES in S33), the camera controller 140 proceeds to step S32, executing the IBIS operation with the input focal length. That is, when the input focal length is nearly equal to the estimated focal length, the IBIS operation is executed using the input focal length, which is considered to have higher reliability than the estimated focal length, thereby improving accuracy of the image stabilization function.

When it is determined that the input focal length is not nearly equal to the estimated focal length (that is, the input focal length and the estimated focal length are not approximate to each other) (NO in S33), the camera controller 140 determines whether or not the reliability of the estimation result is high (S34). For example, a threshold value larger than the threshold value used in step S16 in FIG. 8 is used for step S34 to perform processing similar to step S16. A specific determination method is similar to step S16, and thus its explanation is omitted.

When it is determined that the reliability of the estimation result is not high (NO in S34), the camera controller 140 displays on the liquid crystal monitor 120 an alert regarding occurrence of camera shake (S35), and executes the IBIS operation with the input focal length (S32). That is, when the reliability of the estimation result is not high, executing the IBIS operation using the input focal length instead of the estimated focal length improves the accuracy of the image stabilization function. At this time, an alert can be displayed to inform that the input focal length input by a user may be incorrect.

When it is determined that the reliability of the estimation result is high (YES in S34), the camera controller 140 executes the IBIS operation with the estimated focal length (S36). The camera controller 140 sets the estimated focal length calculated in step S13 or S13-1 as the final setting value of the focal length, and executes the IBIS operation using the estimated focal length and the shake amount of the digital camera 1 based on the gyro signal of the gyro sensor 184.

As described above, exclusively when it is determined that the reliability of the estimation result is high (YES in S34), the IBIS operation is performed using the estimated focal length instead of the input focal length (S36), thereby executing the image stabilization operation accurately. Further, when the estimated focal length is used to execute the IBIS operation, it is just necessary to press the automatic detection key 54 on the setting screen illustrated in FIG. 3. An input using the input area 50 is not necessary, and the convenience of setting a focal length can be thus improved.

3. Summary

As described above, each of the digital camera 1 and the camera body 100 according to the present embodiment is an example of the imaging apparatus, including the image sensor 110 as an example of an image sensor, the gyro sensor 184 as an example of a shake detector, the sensor driver 181 and the IBIS processor 183 as an example of a first image stabilizer, and the camera controller 140 as an example of a controller. The image sensor 110 is configured to capture a subject image formed via the interchangeable lens 200 to generate image data. The gyro sensor 184 is configured to detect the angular velocity ω as the shake amount of the digital camera 1. The camera controller 140 executes the IBIS operation as the image stabilization operation for moving the image sensor 110 based on the detected angular velocity ω and the focal length of the interchangeable lens 200. When the camera controller 140 can not obtain information on the focal length of the interchangeable lens 200 from the interchangeable lens 200 (NO in S1 or NO in S2), the camera controller 140 controls to performs the IBIS operation using the estimated focal length as the focal length of the interchangeable lens 200 (S7, S9 to S13, S14, or S9-1 to S13-1) calculated based on the detected angular velocity ω and the image motion amount ΔM in the image data (S36).

According to the above-described imaging apparatus, even when it is not possible to obtain the information regarding the focal length from the interchangeable lens 200, the IBIS operation can be executed using the estimated focal length as the focal length of the interchangeable lens 200.

Thus, the image stabilization operation can be executed without a user input of the focal length on the setting screen of the liquid crystal monitor 120. This achieves the image stabilization function with improved convenience of setting a focal length. Further, the estimated focal length is calculated based on the shake amount and the image motion amount ΔM, thereby making it easier to calculate the estimated focal length close to the actual focal length.

In the imaging apparatus of the present embodiment, the camera controller 140 controls whether to execute or stop the IBIS operation based on a correlation between the detected angular velocity ω and the image motion amount ΔM (S14, S9-1 to S19, and S21 to S36). Thus, even when it is not possible to obtain the information regarding the focal length from the interchangeable lens 200, for example, simultaneous execution of the IBIS operation and the OIS operation is avoided, and an alert regarding occurrence of camera shake is displayed, thereby improving the function of the image stabilization operation.

In the imaging apparatus of the present embodiment, the camera controller 140 determines, based on the correlation between the detected angular velocity ω and the image motion amount ΔM, whether or not the OIS operation is being executed by the OIS driver 221 and the OIS processor 223 as a second image stabilizer provided in the interchangeable lens 200 (S14 and S9-1 to S19). In this way, it is possible to estimate whether or not the OIS operation is being executed based on the degree of correlation between the angular velocity ω and the image motion amount ΔM.

In the imaging apparatus of the present embodiment, when it is determined that the OIS operation is not being executed by the OIS driver 221 and the OIS processor 223 (OFF in S21), the camera controller 140 controls the sensor driver 181 and the IBIS processor 183 to execute the IBIS operation (S32 and S36). Thus, the IBIS operation can be executed alone without the OIS operation being executed, avoiding simultaneous execution of the OIS operation and the IBIS operation, and thus the image stabilization operation can be executed accurately.

In the imaging apparatus of the present embodiment, when it is determined that the OIS operation is being executed by the OIS driver 221 and the OIS processor 223 (ON in S21), the camera controller 140 notifies information regarding camera shake in the digital camera 1 (S24), and controls to execute the IBIS operation (S25). Thus, information regarding camera shake is notified when the OIS operation and the IBIS operation are executed at the same time so that a user may be accurately informed of occurrence of camera shake.

In the imaging apparatus of the present embodiment, when it is determined that the OIS operation is being executed by the OIS driver 221 and the OIS processor 223 (ON in S21), the camera controller 140 controls to stop the IBIS operation (S23). Thus, it is possible to avoid simultaneous execution of the OIS operation and the IBIS operation.

In the imaging apparatus of the present embodiment, having a plurality of IBIS modes such as "ON", "OFF", and "forced ON" for executing the IBIS operation. When "forced ON", which is a specific IBIS mode among the plurality of IBIS modes, is set, the camera controller 140 controls to forcibly execute the IBIS operation (S25) instead of stopping the IBIS operation (S23). Thus, when an IBIS mode for forcibly executing the IBIS operation is set, the IBIS operation is not stopped but forcibly executed so that a control can be performed in accordance with a user's intention.

In the imaging apparatus of the present embodiment, when the IBIS operation is forcibly executed (S25), the camera controller 140 controls to notify camera shake information on the digital camera 1 (S24). Thus, when there is a high possibility that the OIS operation and the IBIS operation are being executed independently at the same time, information regarding camera shake is notified so that the user is informed that camera shake is likely to occur.

Further, each of the digital camera 1 and the camera body 100 according to the present embodiment is an example of the imaging apparatus, including the image sensor 110 as an example of the image sensor, the gyro sensor 184 as an example of the shake detector, the sensor driver 181 and the IBIS processor 183 as an example of the first image stabilizer, the camera controller 140 as an example of the controller, and the input area 50 as an example of an input device. The image sensor 110 is configured to capture a subject image formed via the interchangeable lens 200 to generate image data. The gyro sensor 184 is configured to detect the angular velocity ω as the shake amount of the digital camera 1. The camera controller 140 executes the IBIS operation as the image stabilization operation for moving the image sensor 110 based on the detected angular velocity ω and the focal length of the interchangeable lens 200. The input area 50 is configured to receive input of the focal length. When the camera controller 140 can not obtain information on the focal length of the interchangeable lens 200 from the interchangeable lens 200 (NO in S1 or NO in S2) and when no input of the focal length is received by the input area 50 (S7 and S8, or NO in S31), the camera controller 140 controls to perform the IBIS operation using, as the focal length of the interchangeable lens 200, the estimated focal length (S7, S9 to S13, S14, or S9-1 to S13-1) estimated as the focal length of the interchangeable lens 200 (S36). Further, when the camera controller 140 can not obtain information on the focal length of the interchangeable lens 200 from the interchangeable lens 200 (NO in S1 or NO in S2) and when the input of the focal length is received by the input area 50 (S6, or YES in S31), the camera controller 140 selects either the estimated focal length or the input focal length as the focal length for the IBIS operation based on comparison between the estimated focal length and the input focal length and the reliability of the estimated focal length (S32 to S36).

According to the above-described imaging apparatus, even when it is not possible to obtain the information regarding the focal length from the interchangeable lens 200, the IBIS operation can be executed using the estimated focal length or the input focal length as the focal length of the interchangeable lens 200. Thus, the image stabilization operation can be executed even when a user does not input the focal length on the setting screen of the liquid crystal monitor 120. This enables the image stabilization function with improved convenience of setting a focal length.

In the imaging apparatus of the present embodiment, when the comparison results in that the estimated focal length and the input focal length are approximate to each other (YES in S33), the camera controller 140 selects the input focal length as the focal length for the IBIS operation (S32). Thus, the IBIS operation is executed using the input focal length, which is considered to have higher reliability, thereby improving the accuracy of the image stabilization function.

In the imaging apparatus of the present embodiment, when the comparison results in that the estimated focal length and the input focal length are not approximate to each other (NO in S33), the camera controller 140 selects either the estimated focal length or the input focal length as the focal length for the IBIS operation based on the reliability of the estimated focal length (S32 and S34 to S36). Thus, which of the estimated focal length or the input focal length is to be used as the focal length of the IBIS operation is selected based on the reliability of the estimated focal length, thereby improving the accuracy of the image stabilization function.

In the imaging apparatus of the present embodiment, when the reliability of the estimated focal length is higher than a predetermined threshold value (YES in S34) (S36), the camera controller 140 selects the estimated focal length as the focal length for the IBIS operation. When the reliability of the estimated focal length is lower than the predetermined threshold value (NO in S34), the camera controller 140 selects the input focal length as the focal length for the IBIS operation (S32). Thus, either the estimated focal length or the input focal length, whichever has a higher reliability, can be used as the focal length to execute the IBIS operation, thereby executing the image stabilization operation with higher accuracy.

In the imaging apparatus of the present embodiment, when the reliability of the estimated focal length is lower than the predetermined threshold value (NO in S34), the camera controller 140 controls to notify camera shake information on the digital camera 1 (S35). This makes it possible to suggest a possibility of an error in the focal length based on the input focal length and the estimated focal length not being approximate to each other (NO in S33) and the reliability of the estimation result not being high (NO in S34), informing a user that camera shake is likely to occur.

The imaging apparatus of the present embodiment further includes the liquid crystal monitor 120 configured to display the captured image, and the camera controller 140 controls to change the display mode of the liquid crystal monitor 120 from FIG. 9B to FIG. 9C, for example, to provide the notification. Thus, it is possible to provide the notification that is easy for a user to understand.

In the imaging apparatus of the present embodiment, the sensor driver 181 and the IBIS processor 183 perform the image stabilization operation by moving the image sensor 110. Thus, the IBIS operation can be executed.

Other Embodiments

As described above, the embodiment has been described as examples of the technique disclosed in the present application. However, the technique in the present disclosure is not limited to this, and is also applicable to embodiments in which changes, replacements, additions, omissions, or the like are appropriately made. Further, it is also possible to combine the components described in the above-described embodiment to form a new embodiment. Thus, other embodiments will be exemplified below.

In the above-described embodiment, steps S3, S5, and S6 are executed in the flow illustrated in FIG. 4. Not limited thereto, steps S3, S5, and S6 may not be executed. In this case, when the determination result is NO in step S or NO in step S2, the focal length estimation processing is performed (S7), the focal length is stored (S8), and the estimated focal length is used to execute the IBIS operation. In this way, not the input focal length but the estimated focal length is used to execute the IBIS operation, thereby executing the IBIS operation without displaying a setting screen as illustrated in FIG. 3. Thus, it is not necessary to input the focal length, and the convenience of setting a focal length can be improved.

In the above-described embodiment, when it is determined in step S27 that the probability of occurrence of a camera shake image is high (determined to be high in S27), a camera shake alert is displayed (S28), and the IBIS operation is not executed (S29). However, this example is not restrictive. For example, when it is determined in step S27 that the probability of occurrence of a camera shake image is high, the IBIS operation may be forcibly executed instead of performing steps S28 and S29. Since it is determined in step S21 that the OIS operation setting is OFF, even when it is determined in step S26 that the IBIS operation setting is OFF, the IBIS operation may be forcibly executed as long as the probability of occurrence of camera shake image is determined to be high, thereby correcting blur of an image. Thus, it is possible to reduce the probability of occurrence of a camera shake image.

In the above-described embodiment, the sensor driver 181 and the IBIS processor 183 as the first image stabilizer execute the IBIS operation to move the image sensor 110 as the image sensor. However, such a case is not restrictive. For example, a first image stabilizer may execute another type of image stabilization operation such as an electric image stabilizer (EIS) operation instead of the IBIS operation. The EIS operation corrects camera shake by electronic processing for changing a position and orientation of an effective pixel area used in subsequent processing in image data generated by the image sensor 110.

In the above-described embodiment, the estimated focal length is calculated based on the angular velocity a as the shake amount and the image motion amount ΔM (S7, S9 to S13, S14, or S9-1 to S13-1). However, such a case is not restrictive. Instead of the image motion amount ΔM, a motion amount of the image sensor 110 as an image sensor (for example, a moving amount of the image sensor 110 by the IBIS operation) may be used to calculate the estimated focal length. That is, the estimated focal length may be calculated based on at least one of a combination of the angular velocity ω and the image motion amount ΔM or a combination of the angular velocity ω and the motion amount of the image sensor 110. A known method can be applied as a method of calculating the estimated focal length based on a combination of the angular velocity ω and the motion amount of the image sensor 110 (see, for example, JP 2018-173571 A).

Similarly, in the above-described embodiment, whether to execute or stop the IBIS operation by the sensor driver 181 and the IBIS processor 183 as the first image stabilizer is controlled based on the correlation between the detected angular velocity ω and the image motion amount ΔM (S14, S9-1 to S19, and S21 to S36). However, such a case is not restrictive. Instead of the image motion amount ΔM, the motion amount of the image sensor 110 may be used to control whether to execute or stop the image stabilization operation by the first image stabilizer. That is, whether to execute or stop the image stabilization operation by the first image stabilizer may be controlled based on at least one of the correlation between the angular velocity ω and the image motion amount ΔM or a correlation between the angular velocity ω and the motion amount of the image sensor 110.

Similarly, in the above-described embodiment, whether or not the OIS operation is being executed by the OIS driver 221 and the OIS processor 223 as the second image stabilizer is determined based on the correlation between the detected angular velocity ω and the image motion amount ΔM (S14 and S9-1 to S19). However, such a case is not restrictive. Instead of the image motion amount ΔM, the motion amount of the image sensor 110 may be used to determine whether or not the image stabilization operation by the second image stabilizer is being executed. That is, whether or not the image stabilization operation by the second image stabilizer is being executed may be determined based on at least one of the correlation between the angular velocity ω and the image motion amount ΔM or the correlation between the angular velocity ω and the motion amount of the image sensor 110.

In the above-described embodiment, it is determined whether or not the input focal length is approximate to the estimated focal length (S33), and when it is determined that the input focal length and the estimated focal length are not approximate to each other (NO in S33), it is determined whether or not the reliability of the estimation result is high (S34). However, such a case is not restrictive. Either step S33 or step S34 may be omitted. When step S33 is omitted, when it is determined that there is an input focal length in step S31 (YES in S31), the processing may proceed to step S34 directly. When step S34 is omitted, when it is determined in step S33 that the input focal length and the estimated focal length are not approximate to each other (NO in S33), the processing may proceed to step S35 directly.

That is, when the camera controller 140 can not obtain information on the focal length of the interchangeable lens 200 from the interchangeable lens 200 (NO in S1 or NO in S2) and the focal length is input to the input area 50 (S6, or YES in S31), the camera controller 140 may select either the estimated focal length or the input focal length as the focal length for the IBIS operation based on comparison between the estimated focal length and the input focal length and/or based on the reliability of the estimated focal length.

Figure 10:
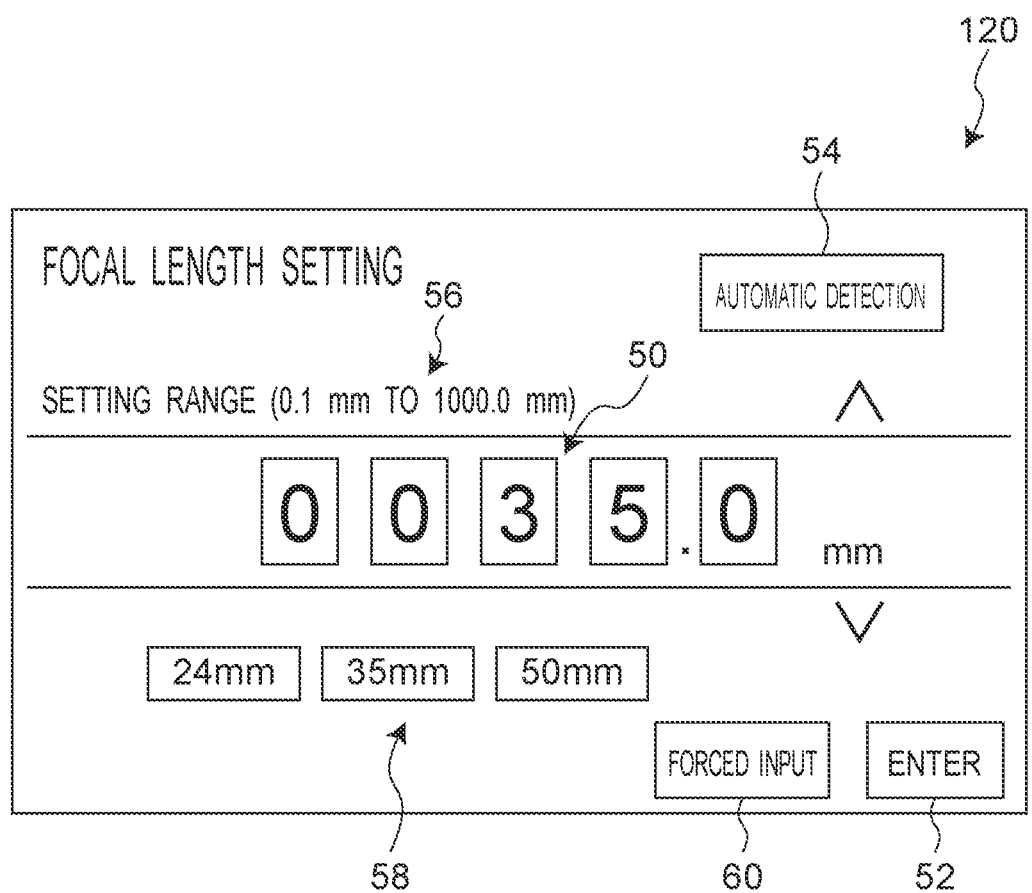
FIG. 10 is a diagram illustrating an example of a focal length setting screen in a modified example.

In the above-described embodiment, when the focal length is input to the input area 50 (S6, or YES in S31), either the input focal length or the estimated focal length is selected as the focal length for the IBIS operation in accordance with various conditions (S32 to S36). However, such a case is not restrictive. For example, a forced input key 60 may be provided on the setting screen for setting the focal length as illustrated in FIG. 10. A mode may be provided in which, when the forced input key 60 is pressed, the IBIS operation is forcibly executed using the input focal length regardless of the estimated focal length.

In the example illustrated in FIG. 10, the forced input key 60 (second enter key 60) is provided next to the enter key 52 (first enter key 52). In this modified example, processing of a flowchart illustrated in FIG. 11 is executed instead of the processing of the flowchart in FIG. 7.

Figure 11:
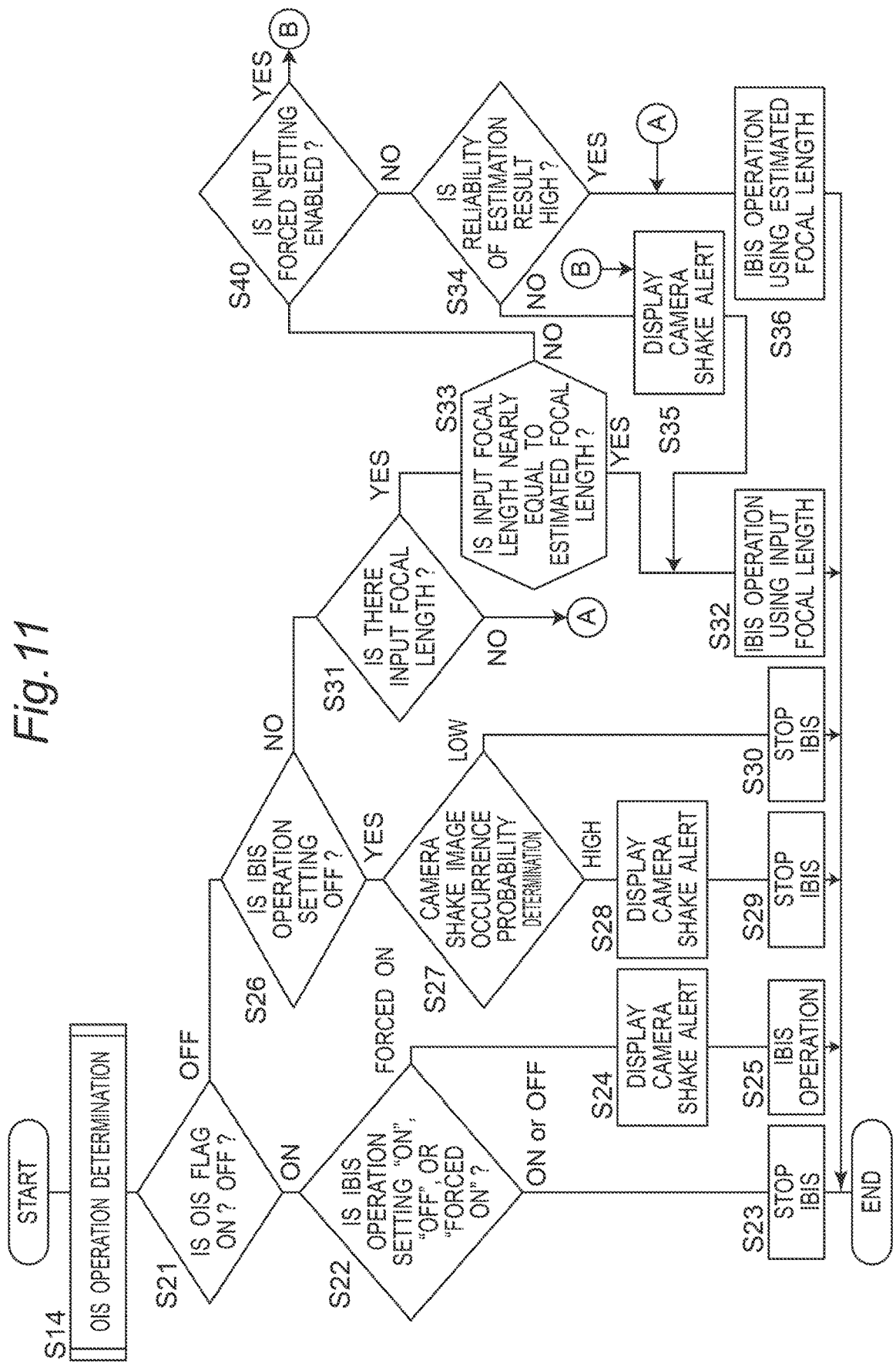
FIG. 11 is a flowchart illustrating an operation example of processing of determining whether to execute or stop an IBIS operation of a digital camera in the modified example.

The flow illustrated in FIG. 11 is a modified example of the flow illustrated in FIG. 7, in which step S40 is added to the flow illustrated in FIG. 7. When it is determined that the input focal length is not nearly equal to the estimated focal length (NO in S33), the camera controller 140 determines whether or not an input forced setting is enabled (S40). When the forced input key 60 is not pressed, such as when the enter key 52 is pressed, it is determined that the input forced setting is not enabled (NO in S40), and the processing proceeds to step S34. When the forced input key 60 is pressed, it is determined that the input forced setting is enabled (YES in S40), and the processing proceeds to steps S35 and then S32.

According to the above-described flow as illustrated in FIG. 11, when the forced input key 60 is pressed, it is determined that the input forced setting is enabled (YES in S40), a camera shake alert is displayed (S35), and the IBIS operation is forcibly executed using the input focal length regardless of the estimated focal length (S32).

According to the flow illustrated in FIG. 11, it is possible to execute the IBIS operation that further reflects a user's intention. Also, when the IBIS operation is forcibly performed using the input focal length, a camera shake alert is displayed (S35). This makes it possible to suggest a possibility of an error in the focal length based on the input focal length and the estimated focal length not being approximate to each other (NO in S33), informing a user that camera shake is likely to occur.

In the example illustrated in FIG. 11, step S40 for determining whether or not the input forced setting is enabled is provided between step S33 and step S34. However, such a case is not restrictive. For example, a step similar to step S40 may be provided between step S31 and step S33. In this case, when it is determined that the input forced setting is not enabled (NO in S40), the processing may proceed to step S33. When it is determined that the input forced setting is enabled (YES in S40), the processing may proceed to step S32 without performing step S35.

As described above, the embodiments have been described as examples of the technique according to the present disclosure. To that end, the accompanying drawings and detailed description are provided.

Thus, the components described in the accompanying drawings and the detailed description may include not just components required for solving the problem but also components not required for solving the problem by way of exemplification of the above-described technique. It is therefore not to be immediately recognized that those non-required components are required just because those non-required components are described in the accompanying drawings or the detailed description.

Further, since the embodiments described above are intended to exemplify the technique of the present disclosure, a variety of changes, substitutions, additions, omissions, and the like can be made within the scope of the claims or the scope of equivalents thereof.

The present disclosure can be applied to various imaging apparatus attachable with an interchangeable lens thereto.

What is claimed is:

1. An imaging apparatus attachable with an interchangeable lens, the imaging apparatus comprising:
    an image sensor configured to capture a subject image formed via the interchangeable lens to generate image data;
    a shake detector configured to detect a shake amount of the imaging apparatus;
    a first image stabilizer configured to perform an image stabilization operation based on the detected shake amount and a focal length of the interchangeable lens; and
    a controller configured to control the image stabilization operation by the first image stabilizer,
    wherein when the controller can not obtain information on the focal length of the interchangeable lens from the interchangeable lens, the controller controls to perform the image stabilization operation using an estimated focal length as the focal length of the interchangeable lens, the estimated focal length being calculated based on at least one of a combination of the detected shake amount and an image motion amount in the image data, or a combination of the detected shake amount and a motion amount of the image sensor, and
    the controller controls whether to execute or stop the image stabilization operation by the first image stabilizer based on at least one of a correlation between the detected shake amount and the image motion amount, or a correlation between the detected shake amount and the motion amount of the image sensor.

2. The imaging apparatus according to claim 1, further comprising a display configured to display the captured image,
    wherein the controller controls to change a display mode of the display to provide a notification for notifying camera shake occurrence in the imaging apparatus.

3. The imaging apparatus according to claim 1, wherein the first image stabilizer performs the image stabilization operation by moving the image sensor.

4. An imaging apparatus attachable with an interchangeable lens, the imaging apparatus comprising:
    an image sensor configured to capture a subject image formed via the interchangeable lens to generate image data;
    a shake detector configured to detect a shake amount of the imaging apparatus;
    a first image stabilizer configured to perform an image stabilization operation based on the detected shake amount and a focal length of the interchangeable lens; and
    a controller configured to control the image stabilization operation by the first image stabilizer,
    wherein when the controller can not obtain information on the focal length of the interchangeable lens from the interchangeable lens, the controller controls to perform the image stabilization operation using an estimated focal length as the focal length of the interchangeable lens, the estimated focal length being calculated based on at least one of a combination of the detected shake amount and an image motion amount in the image data, or a combination of the detected shake amount and a motion amount of the image sensor, and
    the controller determines whether or not an image stabilization operation by a second image stabilizer provided in the interchangeable lens is being executed, based on at least one of a correlation between the detected shake amount and the image motion amount, or a correlation between the detected shake amount and the motion amount of the image sensor.

5. The imaging apparatus according to claim 4, wherein when it is determined that the image stabilization operation by the second image stabilizer is not being executed, the controller controls the first image stabilizer to execute the image stabilization operation.

6. The imaging apparatus according to claim 4, wherein when it is determined that the image stabilization operation by the second image stabilizer is being executed, the controller controls the first image stabilizer to stop the image stabilization operation.

7. The imaging apparatus according to claim 6, having a plurality of image stabilization modes for executing the image stabilization operation, wherein
    when a specific image stabilization mode among the plurality of image stabilization modes is set, the controller controls the first image stabilizer to perform the image stabilization operation instead of stopping the image stabilization operation.

8. The imaging apparatus according to claim 7, wherein when the image stabilization operation is performed, the controller controls to notify camera shake information on the imaging apparatus.

9. An imaging apparatus attachable with an interchangeable lens, the imaging apparatus comprising:
- an image sensor configured to capture a subject image formed via the interchangeable lens to generate image data;
- a shake detector configured to detect a shake amount of the imaging apparatus;
- a first image stabilizer configured to perform an image stabilization operation based on the detected shake amount and a focal length of the interchangeable lens;
- a controller configured to control the image stabilization operation by the first image stabilizer; and
- an input device configured to receive input of the focal length,
- wherein when the controller can not obtain information on the focal length of the interchangeable lens from the interchangeable lens,
- the controller
- controls, in a case of receiving no input of the focal length by the input device, to perform the image stabilization operation using an estimated focal length as the focal length of the interchangeable lens, and
- selects, in a case of receiving input of the focal length by the input device, either the estimated focal length or an input focal length as the focal length for the image stabilization operation based on a comparison between the estimated focal length and the input focal length, and/or based on a reliability of the estimated focal length.

10. The imaging apparatus according to claim 9, wherein when the comparison results in that the estimated focal length and the input focal length are approximate to each other, the controller selects the input focal length as the focal length for the image stabilization operation.

11. The imaging apparatus according to claim 9, wherein when the comparison results in that the estimated focal length and the input focal length are not approximate to each other, the controller selects either the estimated focal length or the input focal length as the focal length for the image stabilization operation based on the reliability of the estimated focal length.

12. The imaging apparatus according to claim 9, wherein
the controller selects, when the reliability of the estimated focal length is higher than a predetermined threshold value, the estimated focal length as the focal length for the image stabilization operation, and wherein
the controller selects, when the reliability of the estimated focal length is lower than the predetermined threshold value, the input focal length as the focal length for the image stabilization operation.

13. The imaging apparatus according to claim 12, wherein when the reliability of the estimated focal length is lower than the predetermined threshold value, the controller controls to notify camera shake information on the imaging apparatus.

* * * * *